US010951823B2

(12) United States Patent
Hao

(10) Patent No.: US 10,951,823 B2
(45) Date of Patent: Mar. 16, 2021

(54) METHOD AND APPARATUS FOR CAPTURING A VIDEO, TERMINAL DEVICE AND STORAGE MEDIUM

(71) Applicant: BEIJING MICROLIVE VISION TECHNOLOGY CO., LTD, Beijing (CN)

(72) Inventor: Yipeng Hao, Beijing (CN)

(73) Assignee: Beijing Microlive Vision Technology Co., Ltd., Beijing (CN)

(*) Notice: Subject to any disclaimer, the term of this patent is extended or adjusted under 35 U.S.C. 154(b) by 0 days.

(21) Appl. No.: 17/021,117

(22) Filed: Sep. 15, 2020

(65) Prior Publication Data
US 2020/0412952 A1 Dec. 31, 2020

Related U.S. Application Data

(63) Continuation of application No. PCT/CN2018/124753, filed on Dec. 28, 2018.

(30) Foreign Application Priority Data

Jul. 19, 2018 (CN) .......................... 201810799339.0

(51) Int. Cl.
*H04N 5/232* (2006.01)
(52) U.S. Cl.
CPC ..... *H04N 5/23245* (2013.01); *H04N 5/23216* (2013.01); *H04N 5/23218* (2018.08); *H04N 5/232935* (2018.08)
(58) Field of Classification Search
CPC ........ H04N 5/23245; H04N 5/232935; H04N 5/23218; H04N 5/23216
(Continued)

(56) References Cited

U.S. PATENT DOCUMENTS 8,467,402 B2* 6/2013 Yoshikawa ......... G06F 3/04842
370/420
9,106,820 B1* 8/2015 Hammendorp .... H04N 5/23245
(Continued)

FOREIGN PATENT DOCUMENTS

CN 103702041 A 4/2014
CN 104301649 A 1/2015
(Continued)

OTHER PUBLICATIONS

International Search Report and Written Opinion dated Apr. 8, 2019 for PCT Patent Application PCT/CN2018/124753.
(Continued)

*Primary Examiner* — Pritham D Prabhakher
(74) *Attorney, Agent, or Firm* — Thomas Horstemeyer, LLP

(57) ABSTRACT

Provided is a method for capturing a video. The method includes the following steps: a video captured instruction is acquired, and video capturing is performed on a target scenario until a video captured pause instruction is acquired, so as to obtain a video segment captured between the video captured instruction and the video captured pause instruction; it is determined whether a video generation instruction is acquired; if the video generation instruction is not acquired, the video captured instruction and the video captured pause instruction are acquired repeatedly to obtain corresponding video segments until the video generation instruction is acquired; and based on the video generation instruction, a target video is generated according to the obtained video segments. Further provided are an apparatus for capturing a video, a terminal device and a storage medium.

15 Claims, 24 Drawing Sheets

(58) Field of Classification Search
USPC .................................................. 348/220.1
See application file for complete search history.

(56) References Cited

U.S. PATENT DOCUMENTS

| | | | | |
|---|---|---|---|---|
| 9,858,969 | B2* | 1/2018 | Khan | G11B 27/34 |
| 10,015,438 | B1* | 7/2018 | Lee | H04N 5/2251 |
| 10,250,433 | B1* | 4/2019 | Thompson | H04L 12/1831 |
| 10,529,384 | B2* | 1/2020 | Chen | G11B 27/36 |
| 10,534,434 | B2* | 1/2020 | Yoo | G06F 3/016 |
| 2010/0026843 | A1* | 2/2010 | Tezuka | H04N 5/23232 |
| | | | | 348/231.2 |
| 2010/0061197 | A1 | 3/2010 | Yoshikawa et al. | |
| 2012/0050556 | A1* | 3/2012 | Hamada | H04N 5/23212 |
| | | | | 348/220.1 |
| 2016/0225408 | A1* | 8/2016 | Khan | H04N 5/772 |
| 2017/0048490 | A1* | 2/2017 | Martinez | H04N 5/23218 |
| 2017/0188097 | A1 | 6/2017 | Jones | |
| 2018/0082142 | A1* | 3/2018 | Han | H04N 5/77 |
| 2018/0268870 | A1* | 9/2018 | Chen | G11B 27/34 |
| 2018/0343378 | A1* | 11/2018 | Choo | H04N 5/23203 |
| 2019/0253619 | A1* | 8/2019 | Davydov | G06F 3/0481 |

FOREIGN PATENT DOCUMENTS

| | | |
|---|---|---|
| CN | 104519262 A | 4/2015 |
| CN | 105812665 A | 7/2016 |
| CN | 106254776 A | 12/2016 |
| CN | 106303238 A | 1/2017 |
| CN | 107171945 A | 9/2017 |
| CN | 107613235 A | 1/2018 |
| CN | 108965706 A | 12/2018 |

OTHER PUBLICATIONS

1st Search Report dated Mar. 25, 2019 for Chinese Patent Application No. 201810799339.0.
1st Office Action dated Apr. 2, 2019 for Chinese Patent Application No. 201810799339.0.
2nd Office Action dated Oct. 11, 2019 for Chinese Patent Application No. 201810799339.0.
3rd Office Action dated Feb. 3, 2020 for Chinese Patent Application No. 201810799339.0.

* cited by examiner

METHOD AND APPARATUS FOR CAPTURING A VIDEO, TERMINAL DEVICE AND STORAGE MEDIUM

CROSS-REFERENCE TO RELATED APPLICATIONS

This is continuation of International Patent Application No. PCT/CN2018/124753, filed on Dec. 28, 2018, which is based on and claims priority to Chinese Patent Application No. 201810799339.0 filed with the CNIPA on Jul. 19, 2018, disclosures of which are incorporated herein by reference in their entireties.

TECHNICAL FIELD

The present disclosure relates to video capturing technologies and, for example, to a method and apparatus for capturing a video, a terminal device and a storage medium.

BACKGROUND

A current method for capturing a video is usually that a complete video is obtained by one-time capturing. If the video is desired to be spliced or clipped, the video needs to be processed by dedicated video processing software.

However, for the use of the video processing software, in one aspect, a video processing personnel is required to master the use skills of the video processing software, and in another aspect, a terminal device is required to be installed with the video processing software and have a system running environment of this software. Moreover, the export and import of the video are also involved. Therefore, the technical threshold in the operations is high, which is not conducive to the daily use of a user and affects the user experience.

SUMMARY

Embodiments of the present disclosure provide a method and apparatus for capturing a video, a terminal device and a storage medium, so as to improve the flexibility of a user in video capturing and video processing and improve the user experience.

The present disclosure provides a method for capturing a video. The method includes the steps described below.

A video captured instruction is acquired, and video capturing is performed on a target scenario until a video captured pause instruction is acquired, so as to obtain a video segment captured between the video captured instruction and the video captured pause instruction.

It is determined whether a video generation instruction is acquired.

If the video generation instruction is not acquired, the video captured instruction and the video segment pause instruction are acquired repeatedly to obtain at least one video segment until the video generation instruction is acquired.

Based on the video generation instruction, a target video is generated according to the obtained video segments.

The present disclosure further provides a method for capturing a video. The method includes the steps described below.

A long-press operation of a press-to-capture control on a wait capturing instruction interface is detected.

A captured target scenario is displayed on the wait capturing instruction interface until a release operation of the press-to-capture control is detected, so as to obtain a video segment.

It is determined whether a trigger operation of a next step control on the wait capturing instruction interface is detected.

In response to determining that the trigger operation of the next step control on the wait capturing instruction interface is not detected, the long-press operation and the release operation of the press-to-capture control are acquired repeatedly to obtain at least one video segment until the trigger operation of the next step control on the wait capturing instruction interface is detected.

It is jumped from the wait capturing instruction interface to a captured video storage interface according to the trigger operation of the next step control, and a result of obtaining a target video by synthesizing the obtained video segments is displayed on the captured video storage interface.

The present disclosure further provides an apparatus for capturing a video. The apparatus includes a capturing module, a determination module and a synthesis module.

The capturing module is configured to acquire a video captured instruction, and perform video capturing on a target scenario until acquiring a video captured pause instruction, so as to obtain a video segment captured between the video captured instruction and the video captured pause instruction.

The determination module is configured to determine whether a video generation instruction is acquired.

The capturing module is further configured to, in response to determining that the video generation instruction is not acquired, acquire the video captured instruction and the video segment pause instruction repeatedly to obtain at least one video segment until acquiring the video generation instruction.

The synthesis module is configured to, based on the video generation instruction, generate a target video according to the obtained video segments.

The present disclosure further provides an apparatus for capturing a video. The apparatus includes a detection module and a processing module.

The detection module is configured to detect a long-press operation of a press-to-capture control on a wait capturing instruction interface.

The processing module is configured to display a captured target scenario on the wait capturing instruction interface until detecting a release operation of the press-to-capture control, so as to obtain a video segment.

The detection module is further configured to determine whether a trigger operation of a next step control on the wait capturing instruction interface is detected, and in response to determining that the trigger operation of the next step control on the wait capturing instruction interface is not detected, acquire the long-press operation and the release operation of the press-to-capture control repeatedly to obtain at least one video segment until detecting the trigger operation of the next step control on the wait capturing instruction interface.

The processing module is further configured to jump from the wait capturing instruction interface to a captured video storage interface according to the trigger operation of the next step control, and display, on the captured video storage interface, a result of obtaining a target video by synthesizing the obtained video segments.

The present disclosure further provides a terminal device. The terminal device includes a memory, a controller, and a program stored in the memory and executable on the controller, where the controller, when executing the program, implements the method of any embodiment.

In an embodiment, the embodiment of the present disclosure provides a storage medium including an executable instruction, where the executable instruction is configured to, when executed by a controller, perform the method of any embodiment described above.

DETAILED DESCRIPTION

Figure 1:
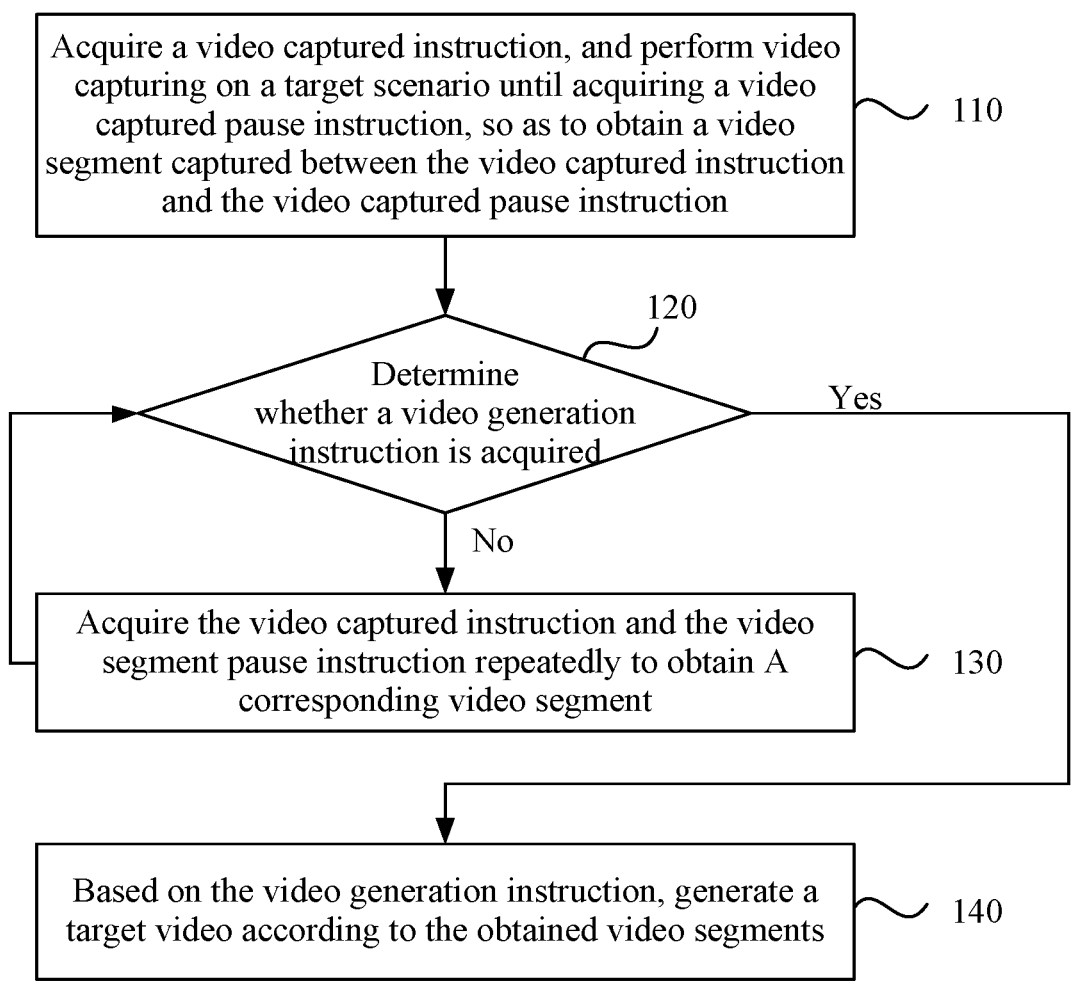
FIG. 1 is a flowchart of a method for capturing a video according to an embodiment of the present disclosure.

The present disclosure is described hereinafter in conjunction with the drawings and embodiments. The embodiments described herein are merely intended to explain the present disclosure but not intended to limit the present disclosure. For ease of description, only part, not all, of the structures related to the embodiments of the present disclosure are illustrated in the drawings.

Embodiment One

FIG. 1 is a flowchart of a method for capturing a video according to an embodiment of the present disclosure. The method may be performed by a terminal device and includes steps 110 to 140.

In step 110, a video captured instruction is acquired, and video capturing is performed on a target scenario until a video captured pause instruction is acquired, so as to obtain a video segment captured between the video captured instruction and the video captured pause instruction.

The terminal device acquires the video captured instruction. The video captured instruction is generated by a long-press operation of a user on a press-to-capture control on a wait capturing instruction interface. That is, when the user long presses the press-to-capture control on the wait capturing instruction interface, the terminal device may be triggered to perform capturing. The target scenario includes all scenarios within the coverage of a camera of the terminal device. The video captured pause instruction may be triggered by the user or by determining whether the length of capturing time reaches a predetermined capturing time threshold. In the case where the video captured pause instruction is triggered by determining whether the length of capturing time reaches the predetermined capturing time threshold, in an embodiment, it is determined whether the length of a captured video reaches the predetermined capturing time threshold, and if the length of the captured video reaches the predetermined capturing time threshold, the video captured pause instruction is triggered. The length of the captured video (or the length of capturing time) includes the length of capturing time for a captured video segment, or the total length of capturing time for multiple captured video segments. Exemplarily, the predetermined capturing time threshold is 15 seconds. When the length of capturing time does not reach 15 seconds, the user may trigger the video captured pause instruction by releasing the press-to-capture control. If the length of the captured video reaches 15 seconds, even if the user is continuously pressing the press-to-capture control, the video captured pause instruction may still be directly triggered. The length of the captured video (or the length of capturing time) includes the length of capturing time for a captured video segment, or the total length of capturing time for multiple captured video segments. That is, a video captured by the user may be uploaded without being segmented or may be uploaded in a manner of combining multiple segments, and the total length of the videos that can be uploaded does not exceed 15 seconds.

After the press-to-capture control is pressed (the video captured instruction is acquired), the terminal device starts to capture the target scenario. The terminal device keeps capturing as long as the press-to-capture control is not released, and the terminal device stops capturing until the press-to-capture control is released (the video captured pause instruction is acquired). At the same time, the terminal device stores the video segment captured between the video captured instruction and the video captured pause instruction. It can be seen that the video segment is a video captured between two specific operations of the user.

In step 120, it is determined whether a video generation instruction is acquired; if the video generation instruction is not acquired, step 130 is performed; and if the video generation instruction is acquired, step 140 is performed.

The video generation instruction is an instruction generated by a trigger operation of the user on a next step control. In the video capturing process, the terminal device determines whether the video generation instruction is acquired, and then performs subsequent operations. In an embodiment, if the video generation instruction is acquired, step 140 is performed.

In step 130, the video captured instruction and the video segment pause instruction are acquired repeatedly to obtain a corresponding video segment, and then, the process returns to step 120.

In step 140, based on the video generation instruction, a target video is generated according to the obtained video segments.

If the video generation instruction is not acquired, the video captured instruction and the video captured pause instruction are acquired repeatedly to obtain the corresponding video segment until the video generation instruction is acquired, and the obtained video segments are synthesized to obtain the target video.

If the user repeats the two specific operations described above, that is, the long-press operation of the press-to-capture control and the release operation of the press-to-capture control, the terminal device performs capturing to obtain one or more video segments according to instructions generated by the corresponding operations. The terminal device synthesizes the obtained video segments to obtain the target video when acquiring the video generation instruction.

In this embodiment of the present disclosure, the video captured instruction is acquired, and the video capturing is performed on the current target scenario until the video captured pause instruction is acquired, so as to obtain a corresponding video segment. Before the video generation instruction is acquired, the video captured instruction and the video captured pause instruction are acquired repeatedly to obtain a corresponding video segment. The current target scenario corresponding to each video segment may be the same or different, which may be determined according to actual situations and is not specifically limited here. Exemplarily, three video segments are obtained through three repetitions, and the current target scenario corresponding to each of the three video segments is a user and a user background.

The video segment is obtained repeatedly until the video generation instruction is acquired, and then, the video capturing may be ended and the obtained video segments may be synthesized to obtain the target video. The video generation instruction may be used for ending the capturing of the current video. In an embodiment, the target video may be obtained by splicing and synthesizing the obtained video segments according to the generating order of the obtained video segments.

Certain video sharing software in a smart phone is taken as an example for illustration. In an embodiment, when a user has a requirement for capturing a video, the user starts an application of the video sharing software by clicking an icon of the video sharing software on a display screen of the smart phone, and a wait capturing instruction interface is entered. The wait capturing instruction interface includes a press-to-capture control, a next step control, a prop control and a countdown control. When the user long presses the press-to-capture control, a camera starts to perform video capturing on a current target scenario until the user releases the press-to-capture control, and then, the capturing of a current video segment is ended and video segment 1 is obtained. When the user long presses the press-to-capture control again, the camera starts to perform video capturing on a current target scenario again until the user releases the press-to-capture control again, and then, the capturing of a current video segment is ended and video segment 2 is obtained. When the user long presses the press-to-capture control for the third time, the camera starts to perform video capturing on a current target scenario for the third time until the user releases the press-to-capture control for the third time, and then, the capturing of a current video segment is ended and video segment 3 is obtained. When the user triggers the next step control, the capturing of the current video is ended, and the obtained video segment 1, video segment 2 and video segment 3 are synthesized to obtain a target video.

In an embodiment, the terminal device sets a predetermined capturing time threshold, that is, the maximum length that the target video captured by the user can reach. If in the process of the user capturing video segments, the length of the captured video is equal to the predetermined capturing time threshold, then all the video segments are directly synthesized to obtain the target video. In this case, the user does not need to trigger the next step control.

Certain video sharing software in a smart phone is taken as an example for illustration. In an embodiment, when a user has a requirement for capturing a video, the user starts an application of the video sharing software by clicking an icon of the video sharing software on a display screen of the smart phone, and a wait capturing instruction interface is entered. The wait capturing instruction interface includes a press-to-capture control, a next step control, a prop control and a countdown control. When the user long presses the press-to-capture control, a camera starts to perform video capturing on a current target scenario until the user releases the press-to-capture control, and then, the capturing of a current video segment is ended and video segment 1 is obtained. When the user long presses the press-to-capture control again, the camera starts to perform video capturing on a current target scenario again until the user releases the press-to-capture control again, and then, the capturing of a current video segment is ended and video segment 2 is obtained. When the user long presses the press-to-capture control for the third time, the camera starts to perform video capturing on a current target scenario for the third time, where in the capturing process of the video segment for this time, the sum of the length of the video segment captured for this time, the length of the video segment 1, and the length of the video segment 2 is equal to the predetermined capturing time threshold. Then, video segment 3 for this time is stored, and the obtained video segment 1, video segment 2 and video segment 3 are synthesized to obtain a target video.

According to the technical scheme of this embodiment of the present disclosure, corresponding instructions are acquired by identifying different operations of the user on the display interface, so as to trigger the capturing to obtain multiple video segments, and then, the multiple video segments are synthesized to obtain the target video. In this way, the intervention of video processing software is no longer required, thereby improving the flexibility of the user in the video capturing and video processing and improving the user experience.

In an embodiment, before the step in which the video captured instruction is acquired each time, the method further includes the following step: a capturing prop is acquired.

To present a better video capturing effect, before the video capturing is performed on the current target scenario, the capturing prop may be selected. The capturing prop includes a sticker, a filter mode and/or a special effect. The sticker may include text, graffiti, an accessory, a position watermark or the like. The filter mode may include a normal mode, a Japanese mode, a time mode, an innocence mode or the like. The special effect may include facial deformation, makeup and hair matching, a background picture or the like.

In an embodiment, the step in which the video capturing is performed on the target scenario includes the following step: a video frame obtained by a camera capturing the target scenario is acquired, and the capturing prop is superposed onto the video frame.

If the capturing prop is acquired, the capturing prop may be superposed into the video capturing process, thus presenting a more interesting video capturing effect. The user has an opportunity to select the capturing prop before the terminal device captures any video segment. If the user selects different capturing props in each capturing, the different capturing props may be superposed into the video capturing process.

In an embodiment, the video captured instruction includes a countdown capturing instruction. In an embodiment, the step in which the video capturing is performed on the target scenario includes the following step: when the countdown capturing instruction is acquired, timing is started until the timing reaches set duration, and the video capturing is performed on the target scenario.

Through the countdown capturing, the capturing may be automatically started after the countdown, thus the user does not need to long press the press-to-capture control all the time.

In an embodiment, after the step in which the target video is generated according to the obtained video segments, the method further includes the following steps: a capturing undo instruction is acquired, and a synthesized video segment is undone according to the capturing undo instruction; and the video captured instruction and the video captured pause instruction are acquired to obtain corresponding video segments until the video generation instruction is acquired, and a new target video is generated according to obtained video segments.

After the obtained video segments are synthesized to obtain the target video, if the user is not satisfied with the synthesized target video, the capturing undo instruction may be generated through a trigger operation of the user on a corresponding control, so as to undo the synthesis of the obtained video segments. After that, the user may continue to long press the press-to-capture control and release the press-to-capture control to obtain a corresponding video segment until the video generation instruction is acquired. Then, the obtained video segments and a latest captured video segment are synthesized to obtain a target video.

In an embodiment, before the step in which the video generation instruction is acquired, the method further includes the following step: a deletion instruction is acquired, and a latest obtained video segment is deleted according to the deletion instruction; and the video captured instruction and the video captured pause instruction are acquired to obtain corresponding video segments until the video generation instruction is acquired, and a target video is generated according to obtained video segments.

In the capturing process of video segments, an obtained video segment may be deleted. If the deletion instruction is acquired, a latest obtained video segment is deleted according to the deletion instruction. After that, the user may continue to long press the press-to-capture control and release the press-to-capture control to obtain a corresponding video segment until the video generation instruction is acquired. Then, the obtained video segments and a latest captured video segment are synthesized to obtain a target video. The above is applicable to the case where the user is not satisfied with the latest video segment, and the latest video segment may be deleted through the deletion instruction.

Embodiment Two

Figure 2:
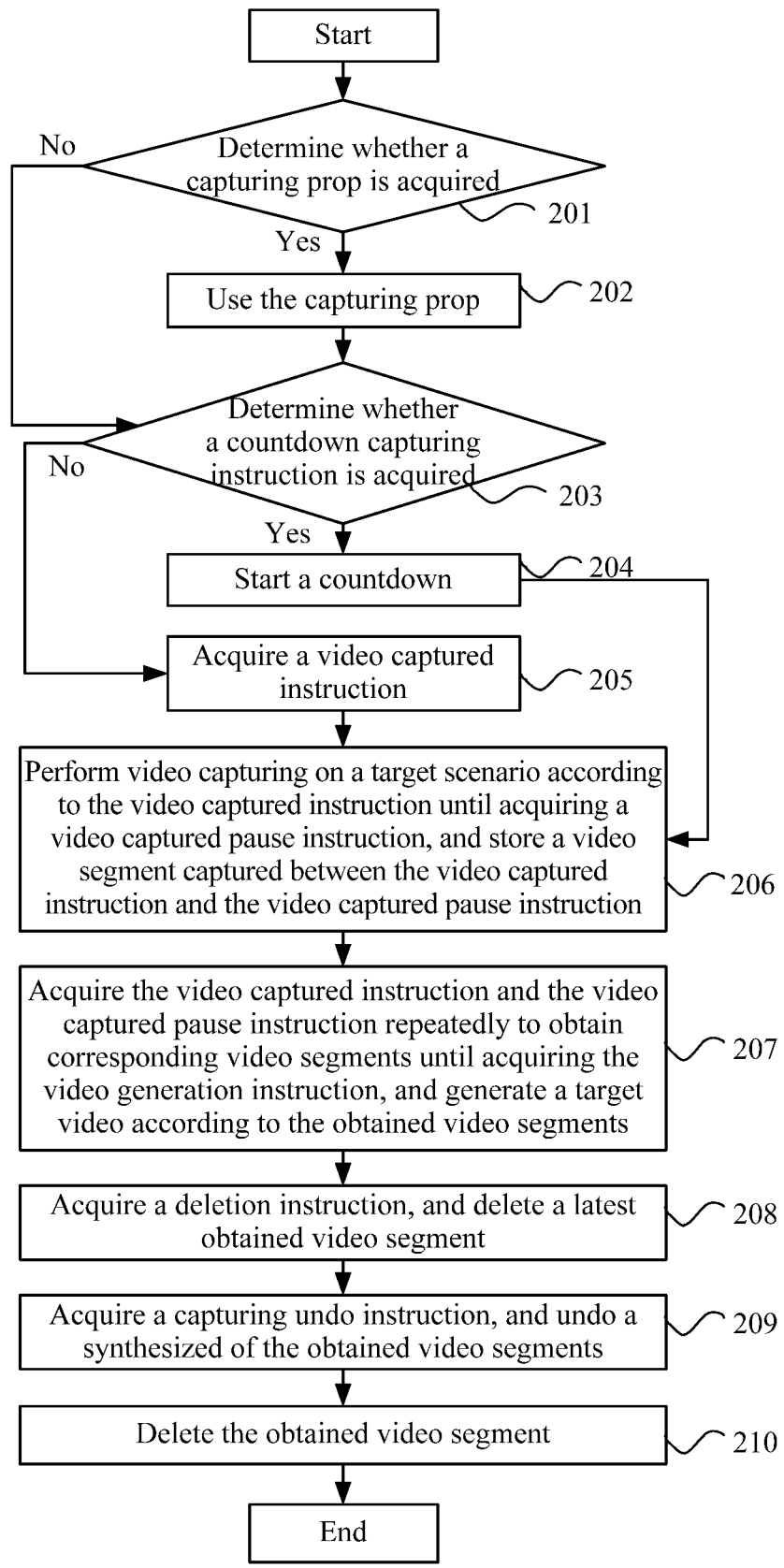
FIG. 2 is a flowchart of another method for capturing a video according to an embodiment of the present disclosure.

In an embodiment, FIG. 2 is a flowchart of another method for capturing a video according to an embodiment of the present disclosure. The method may be performed by a terminal device and includes the steps described below.

In step 201, it is determined whether a capturing prop is acquired.

If the capturing prop is acquired, the process turns to step 202. If the capturing prop is not acquired, the process jumps to step 203. The capturing prop includes a sticker, a filter mode and/or a special effect. The sticker may include text, graffiti, an accessory, a position watermark or the like. The filter mode may include a normal mode, a Japanese mode, a time mode, an innocence mode or the like. The special effect may include facial deformation, makeup and hair matching, a background picture or the like. A user may select the capturing prop before capturing a video and directly beautify the captured video.

In step 202, the capturing prop is used.

Using the capturing prop indicates that the capturing prop selected by the user is superposed while the video is captured.

In step 203, it is determined whether a countdown capturing instruction is acquired.

If the countdown capturing instruction is acquired, the process turns to step 204. If the countdown capturing instruction is not acquired, the process jumps to step 205. The countdown capturing instruction indicates that the user sets countdown duration, so the terminal device does not start capturing the video until the countdown duration is reached.

In step 204, a countdown is started.

After the countdown ends, the process jumps to step 206.

In step 205, a video captured instruction is acquired.

In step 206, video capturing is performed on a target scenario according to the video captured instruction until a video captured pause instruction is acquired, and a video segment captured between the video captured instruction and the video captured pause instruction is stored.

In step 207, the video captured instruction and the video captured pause instruction are acquired repeatedly to obtain corresponding video segments until a video generation instruction is acquired, and a target video is generated according to the obtained video segments.

Steps 201 to 204 may be used before this step, so that there may be an opportunity to select a capturing prop before the terminal device captures any video segment, and different capturing props may be selected in each capturing. Moreover, through the countdown capturing, the capturing may be automatically started after the countdown, thus the user does not need to long press the press-to-capture control all the time.

In step 208, a deletion instruction is acquired, and a latest obtained video segment is deleted.

If the terminal device acquires the delete instruction, the terminal device deletes the latest captured video segment.

In step 209, a capturing undo instruction is acquired, and a synthesis of the obtained video segments is undone.

The capturing undo instruction is generated by a trigger operation of the user on a return control.

After the terminal device synthesizes the target video, the user may further undo the synthesis. After undoing the video synthesis, the user may delete a video segment or continue to capture a video segment.

In step 210, the obtained video segment is deleted.

After obtaining the target video, the terminal device may delete the stored video segment to release the cache space.

According to the technical scheme of this embodiment of the present disclosure, corresponding instructions are acquired by identifying different operations of the user on the display interface, so as to trigger the capturing to obtain multiple video segments, and then, the video segments are beautified and the multiple video segments are synthesized to obtain the target video. In this way, the intervention of video processing software is no longer required, thereby improving the flexibility of the user in the video capturing and video processing and improving the user experience.

Embodiment Three

Figure 3:
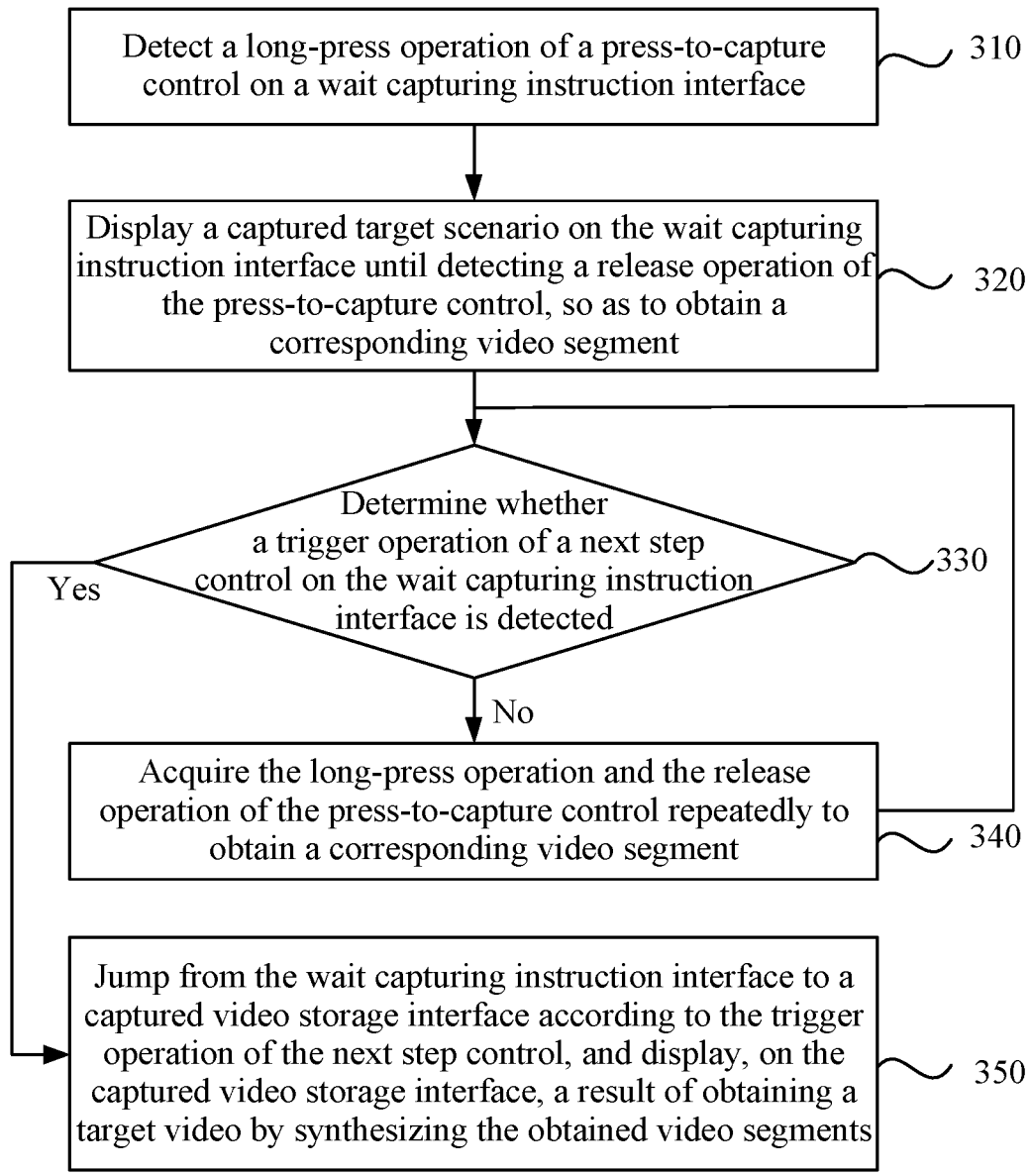
FIG. 3 is a flowchart of another method for capturing a video according to an embodiment of the present disclosure.

FIG. 3 is a flowchart of another method for capturing a video according to an embodiment of the present disclosure. The method may be performed by a terminal device and includes steps 310 to 350.

In step 310, a long-press operation of a press-to-capture control on a wait capturing instruction interface is detected.

In step 320, a captured target scenario is displayed on the wait capturing instruction interface until a release operation of the press-to-capture control is detected, so as to obtain a corresponding video segment.

In step 330, it is determined whether a trigger operation of a next step control on the wait capturing instruction interface is detected; if the trigger operation of the next step control on the wait capturing instruction interface is detected, step 350 is performed; and if the trigger operation of the next step control on the wait capturing instruction interface is not detected, step 340 is performed. In step 340, the long-press operation and the release operation of the press-to-capture control are acquired repeatedly to obtain a corresponding video segment, and then, the process returns to step 330, that is, until the trigger operation of the next step control on the wait capturing instruction interface is detected.

In step 350, it is jumped from the wait capturing instruction interface to a captured video storage interface according to the trigger operation of the next step control, and a result of obtaining a target video by synthesizing the obtained video segments is displayed on the captured video storage interface.

In this embodiment of the present disclosure, the video capturing process may be implemented through operations of the user on relevant controls on a display interface. The display interface is an interface that the user can operate. In an embodiment, the long-press operation of the user on the press-to-capture control on the wait capturing instruction interface is detected, and this operation indicates starting the capturing process of a current video; the release operation of the user on the press-to-capture control indicates ending the capturing of a current video segment; and the trigger operation of the user on the next step control on the wait capturing instruction interface indicates ending the capturing of the current video, it is jumped to the captured video storage interface and the obtained video segments are synthesized to obtain the target video. Each time steps 310 and 320 are performed, a corresponding video segment may be acquired. Alternatively, if the trigger operation of the user on the next step control on the wait capturing instruction interface is detected, the capturing of the current video may be ended, and the obtained video segments are synthesized to obtain the target video; at the same time, it is jumped to the captured video storage interface and the result of obtaining the target video by synthesizing the obtained video segments is displayed. In an embodiment, the target video may be obtained by splicing and synthesizing the obtained video segments according to the generating order of the obtained video segments.

In an embodiment, step 320 further includes the following steps: it is determined whether the length of capturing time reaches a predetermined capturing time threshold while a current target scenario is displayed on the wait capturing instruction interface; if the length of capturing time reaches the predetermined capturing time threshold, it is jumped to the captured video storage interface and the result of obtaining the target video by synthesizing the obtained video segments is displayed. The length of capturing time includes the length of capturing time for a captured video segment or the total length of capturing time for multiple captured video segments.

In this embodiment of the present disclosure, the terminal device sets the predetermined capturing time threshold, that is, the maximum length that the target video captured by the user can reach. If after the long-press operation of the user on the press-to-capture control is detected, the sum of the length of the obtained video segments and the length of a video segment captured for the last time is equal to the predetermined capturing time threshold, then the video segment captured for the last time is stored, and it is jumped to the captured video storage interface to display the result of obtaining the target video by synthesizing all the video segments. In this case, it is not necessary to detect the trigger operation of the user on the next step control.

In an embodiment, before the step in which the long-press operation of the press-to-capture control on the wait capturing instruction interface is detected, the method further includes the following step: a selection operation of the user on a prop control on the wait capturing instruction interface is detected.

To present a better video capturing effect, before the video capturing is performed on the current target scenario, a capturing prop may be selected. The capturing prop includes a sticker, a filter mode and/or a special effect. The sticker may include text, graffiti, an accessory, a position watermark or the like. The filter mode may include a normal mode, a Japanese mode, a time mode, an innocence mode or the like. The special effect may include facial deformation, makeup and hair matching, a background picture or the like.

In an embodiment, the step in which the captured target scenario is displayed on the wait capturing instruction interface includes the following step: the currently captured target scenario on which the capturing prop selected by the user is superposed is displayed on the wait capturing instruction interface.

If the capturing prop is acquired, the capturing prop may be superposed into the video capturing process, thus presenting a more interesting video capturing effect. The user has an opportunity to select a capturing prop before the terminal device captures any video segment. If the user selects different capturing props in each capturing, the different capturing props may be superposed into the video capturing process.

In an embodiment, the method further includes the following step: a trigger operation of the user on a countdown control on the wait capturing instruction interface is detected. In an embodiment, the step in which the current target scenario is displayed on the wait capturing instruction interface includes the following step: when trigger operation of the user on the countdown control is detected, timing is started until the timing reaches set duration, and the current target scenario is displayed on the wait capturing instruction interface.

Through the countdown capturing, the capturing may be automatically started after the countdown, thus the user does not need to long press the press-to-capture control all the time.

In an embodiment, after the step in which it is jumped to the captured video storage interface and the result of obtaining the target video by synthesizing the obtained video segments is displayed, the method further includes the following step: a trigger operation of the user on a return control on the captured video storage interface is detected, and it is jumped to the wait capturing instruction interface.

After the target video is obtained by synthesizing the obtained video segments, if the user is not satisfied with the synthesized target video, the user may trigger the return control on the captured video storage interface. The terminal device detects this operation, undoes the synthesis of the obtained video segments, and jumps to the wait capturing instruction interface.

After that, the user may continue to long press the press-to-capture control and release the press-to-capture control to obtain a corresponding video segment until the video generation instruction is acquired. Then, the obtained video segments and a latest captured video segment are synthesized to obtain a target video.

In an embodiment, the method further includes the following step: a trigger operation of the user on a delete control on the wait capturing instruction interface is detected, and a latest obtained video segment is deleted.

In the capturing process of video segments, an obtained video segment may be deleted. If a trigger operation of the user on the deletion control on the wait capturing instruction interface is detected, the latest obtained video segment is deleted. After that, the user may continue to long press the press-to-capture control and release the press-to-capture control to obtain a corresponding video segment until the video generation instruction is acquired. Then, the obtained video segments and a latest captured video segment are synthesized to obtain a target video. The above is applicable to the case where the user is not satisfied with the latest video segment, and the latest video segment may be deleted through the deletion instruction.

Embodiment Four

Certain video sharing software in a smart phone is taken as an example for illustration.

Figure 4A:
FIG. 4A is a structural diagram of a wait capturing instruction interface according to an embodiment of the present disclosure.

As shown in FIG. 4A, FIG. 4A is a structural diagram of a wait capturing instruction interface. That is, video capturing has not been performed currently. The wait capturing instruction interface may include a press-to-capture control, a next step control, a prop control and a countdown control. The press-to-capture control is a multiplexing control. When a user long presses the press-to-capture control, a video captured instruction is generated. When the user releases the press-to-capture control, a video captured pause instruction is generated. When the user releases the press-to-capture control and then triggers the next step control, a video generation instruction is generated. When the user triggers the prop control, a capturing prop is selected. When the user triggers the countdown control, a countdown capturing instruction is generated. When the user is to perform video capturing on a current target scenario, the video capturing may be implemented through operations of relevant controls on the wait capturing instruction interface. In an embodiment, in the video capturing process, it is jumped from the wait capturing instruction interface to a corresponding display interface. Multiple processes involved in the video capturing are described below in a manner where the user manipulates the controls on the display interface.

Figure 4B:
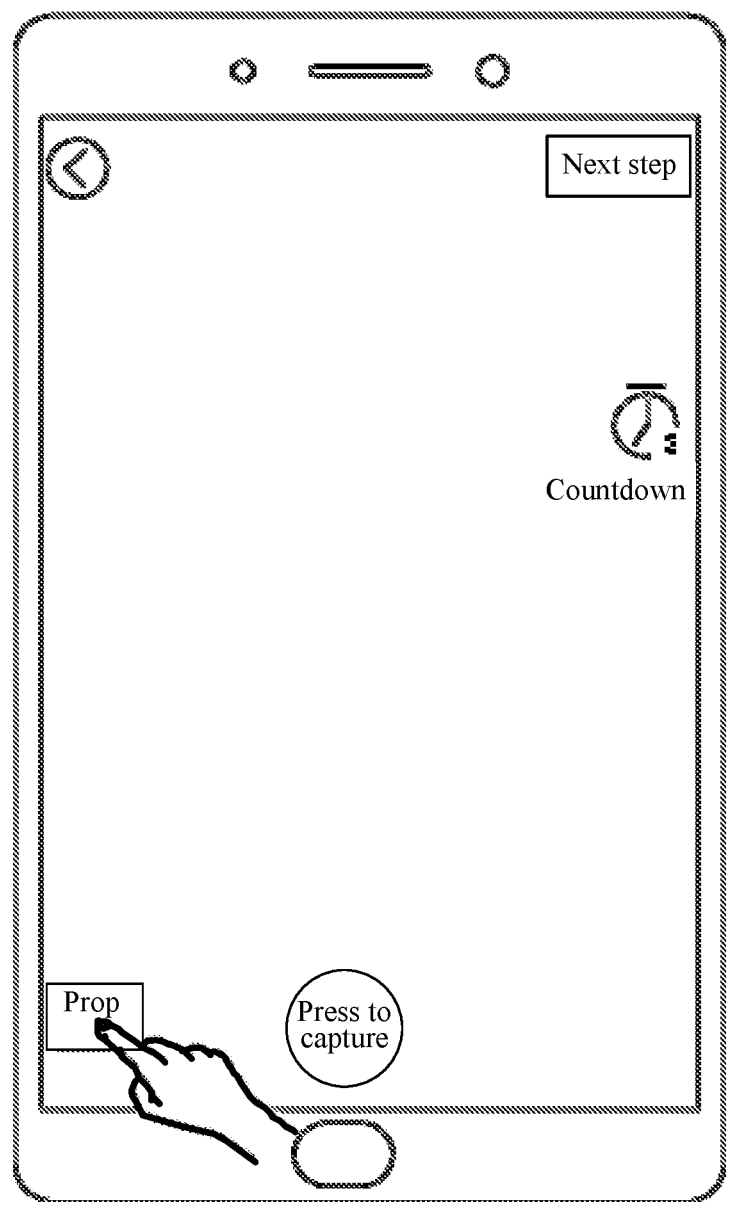
FIG. 4B is a structural diagram of another wait capturing instruction interface according to an embodiment of the present disclosure.
Figure 4C:
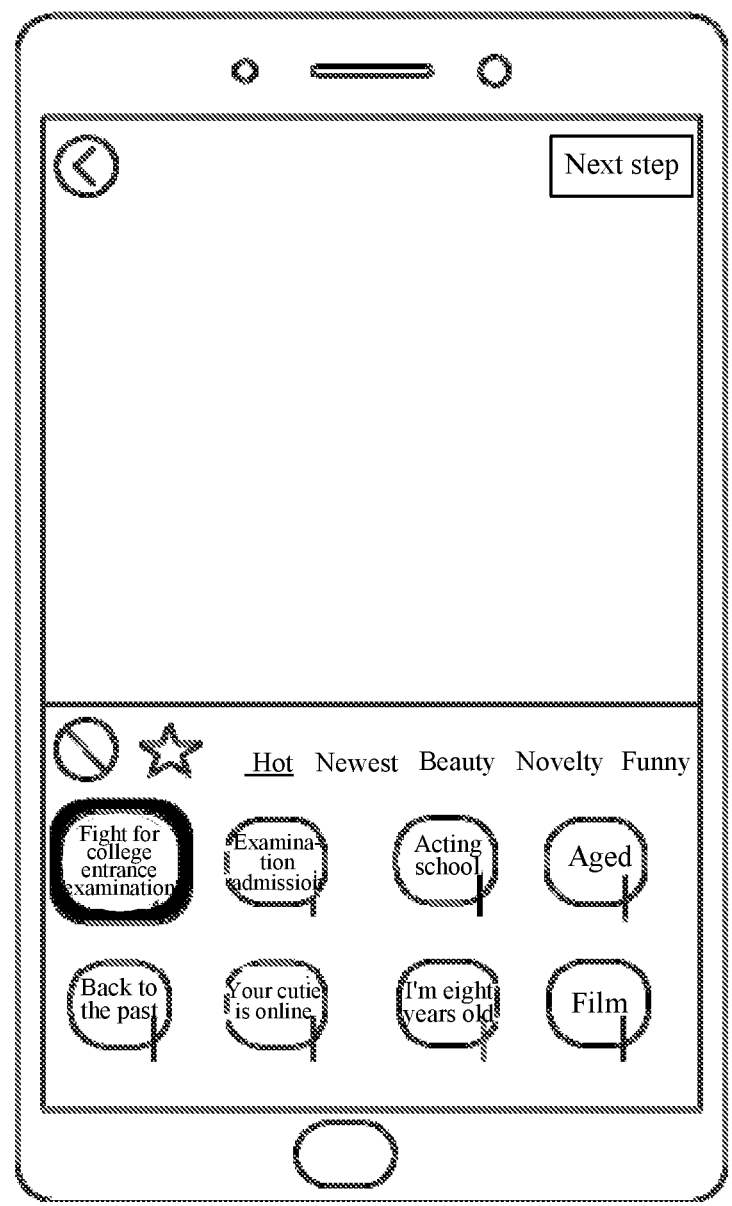
FIG. 4C is a structural diagram of a prop interface according to an embodiment of the present disclosure.

As shown in FIG. 4B, it is jumped to a prop interface shown in FIG. 4C through a trigger operation of the user on the prop control on the wait capturing instruction interface, and the user selects "Fight for college entrance examination".

Figure 4D:
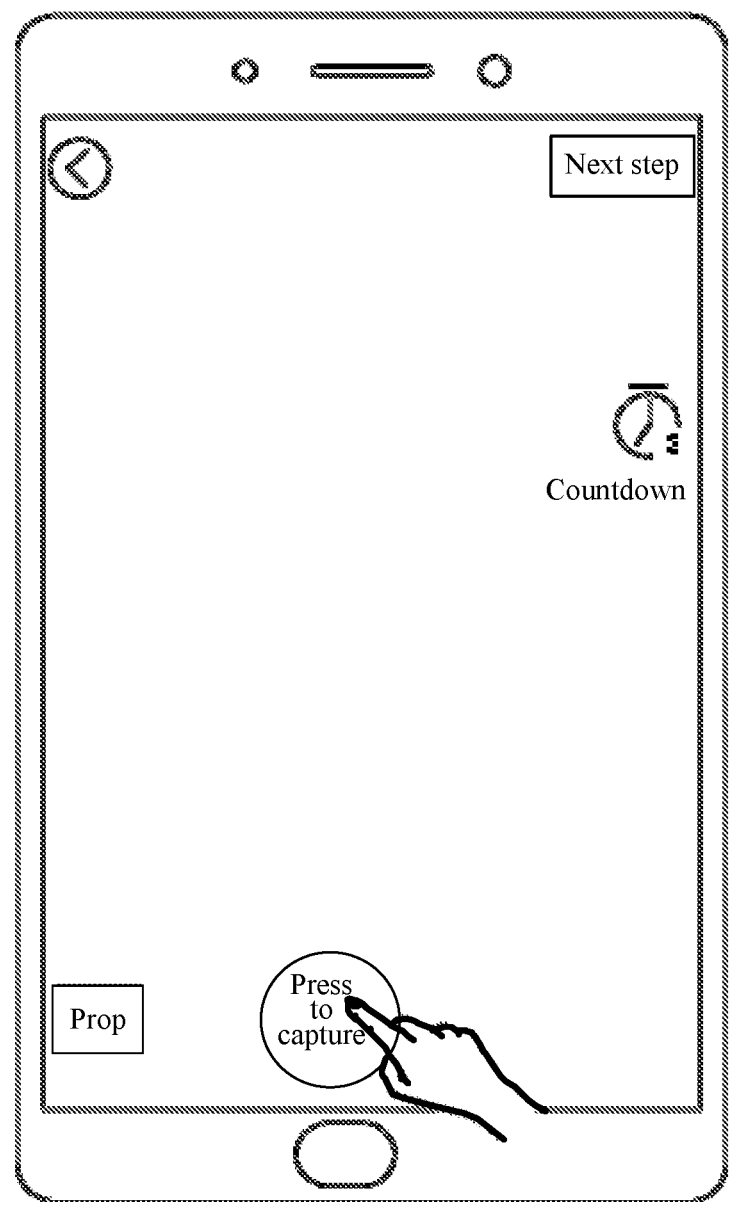
FIG. 4D is a structural diagram of another wait capturing instruction interface according to an embodiment of the present disclosure.
Figure 4E:
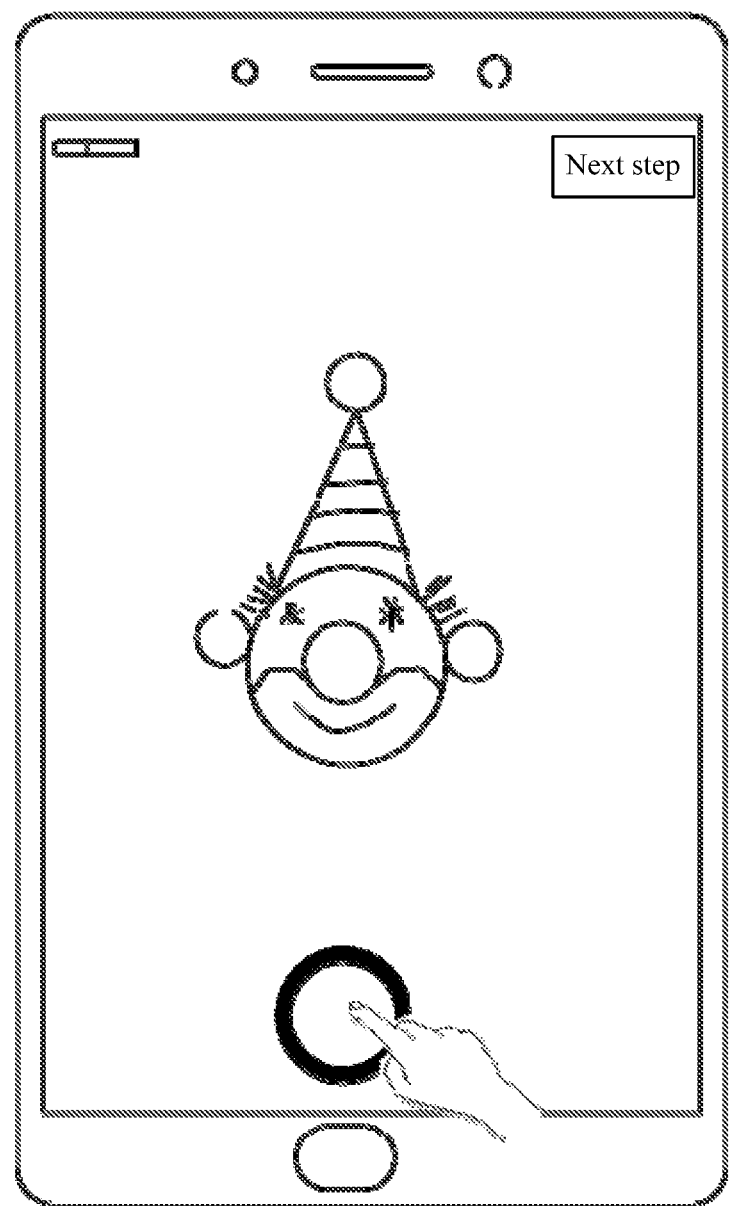
FIG. 4E is a structural diagram of a capturing interface according to an embodiment of the present disclosure.
Figure 4F:
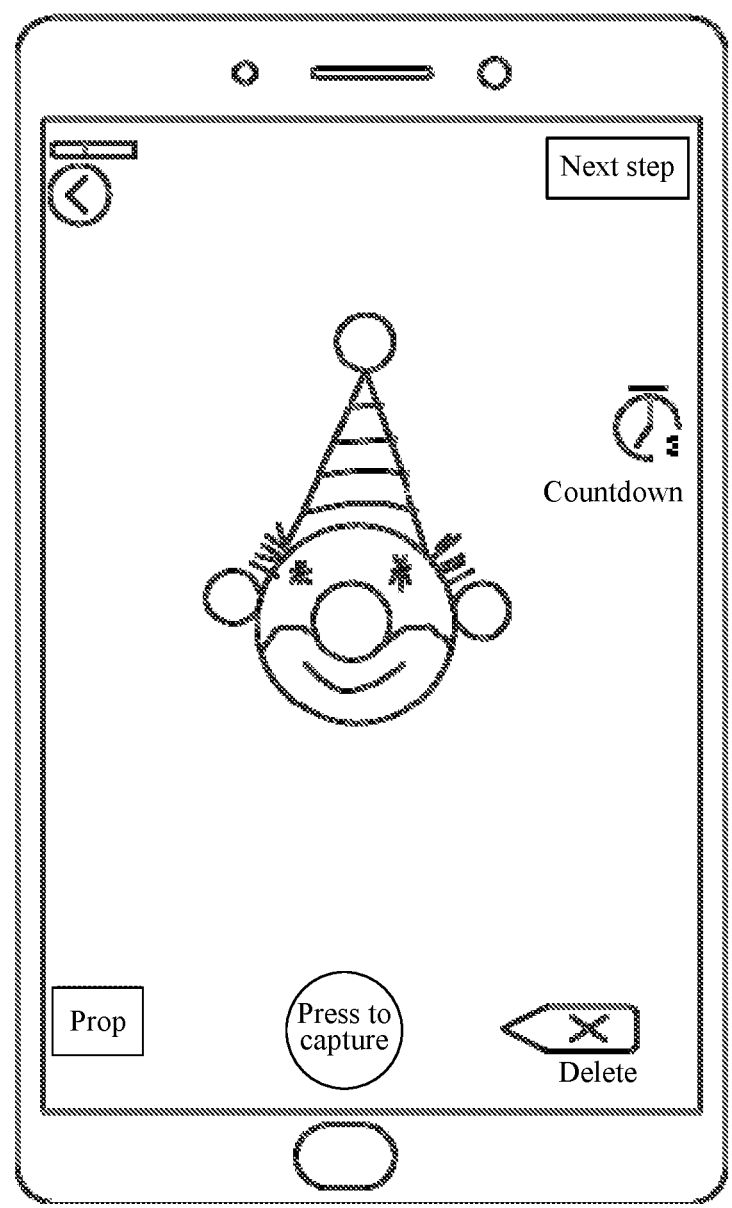
FIG. 4F is a structural diagram of another wait capturing instruction interface according to an embodiment of the present disclosure.
Figure 4G:
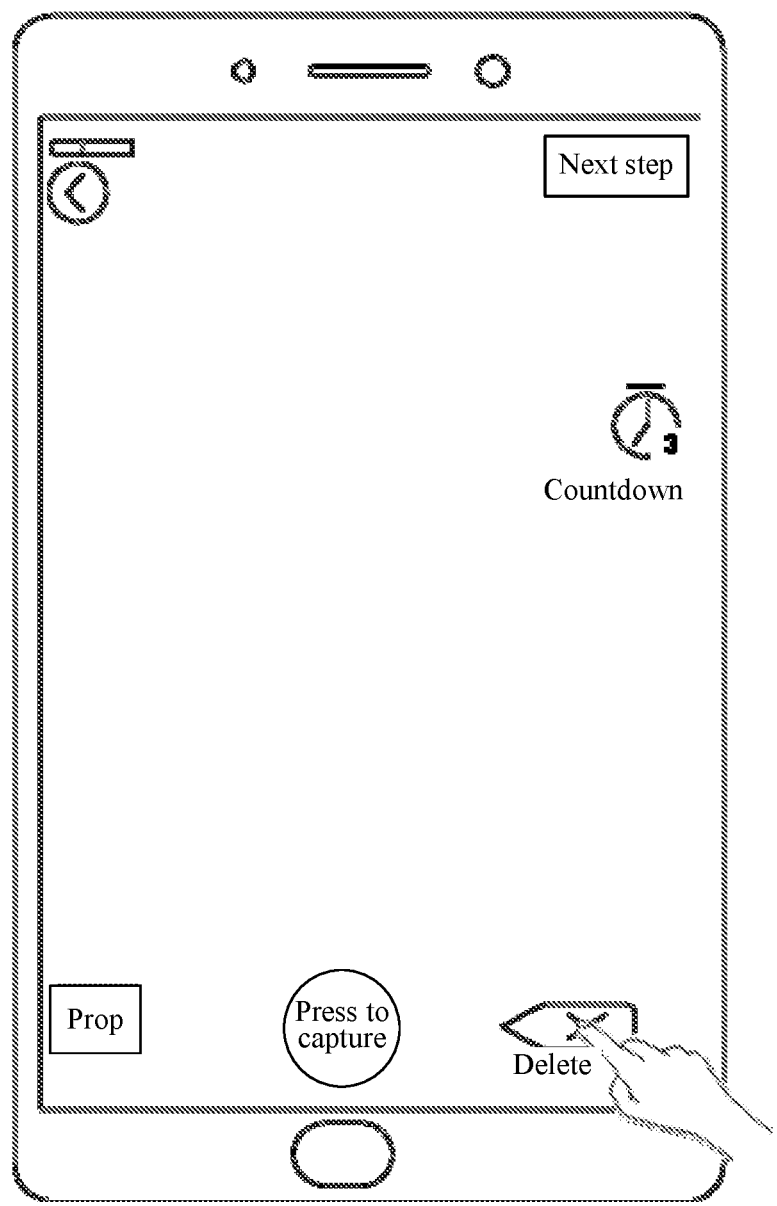
FIG. 4G is a structural diagram of another wait capturing instruction interface according to an embodiment of the present disclosure.
Figure 4H:
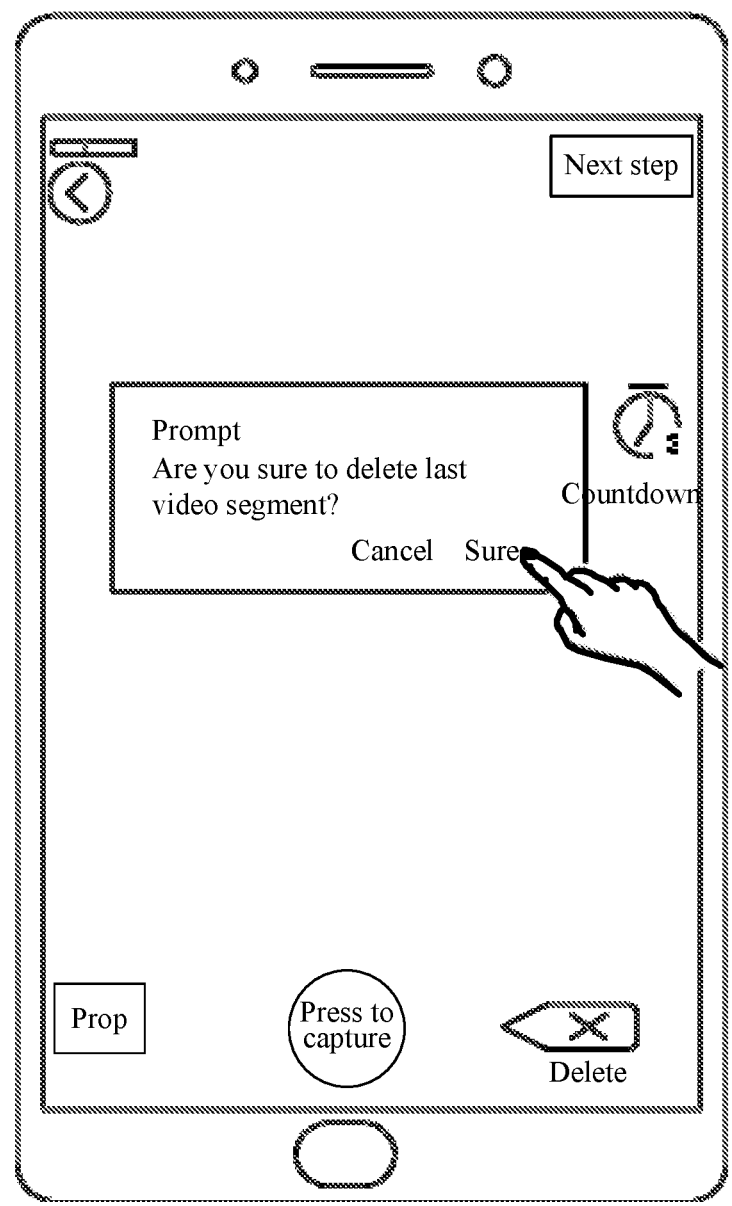
FIG. 4H is a structural diagram of an undo interface according to an embodiment of the present disclosure.
Figure 4I:
FIG. 4I is a structural diagram of another wait capturing instruction interface according to an embodiment of the present disclosure.
Figure 4J:
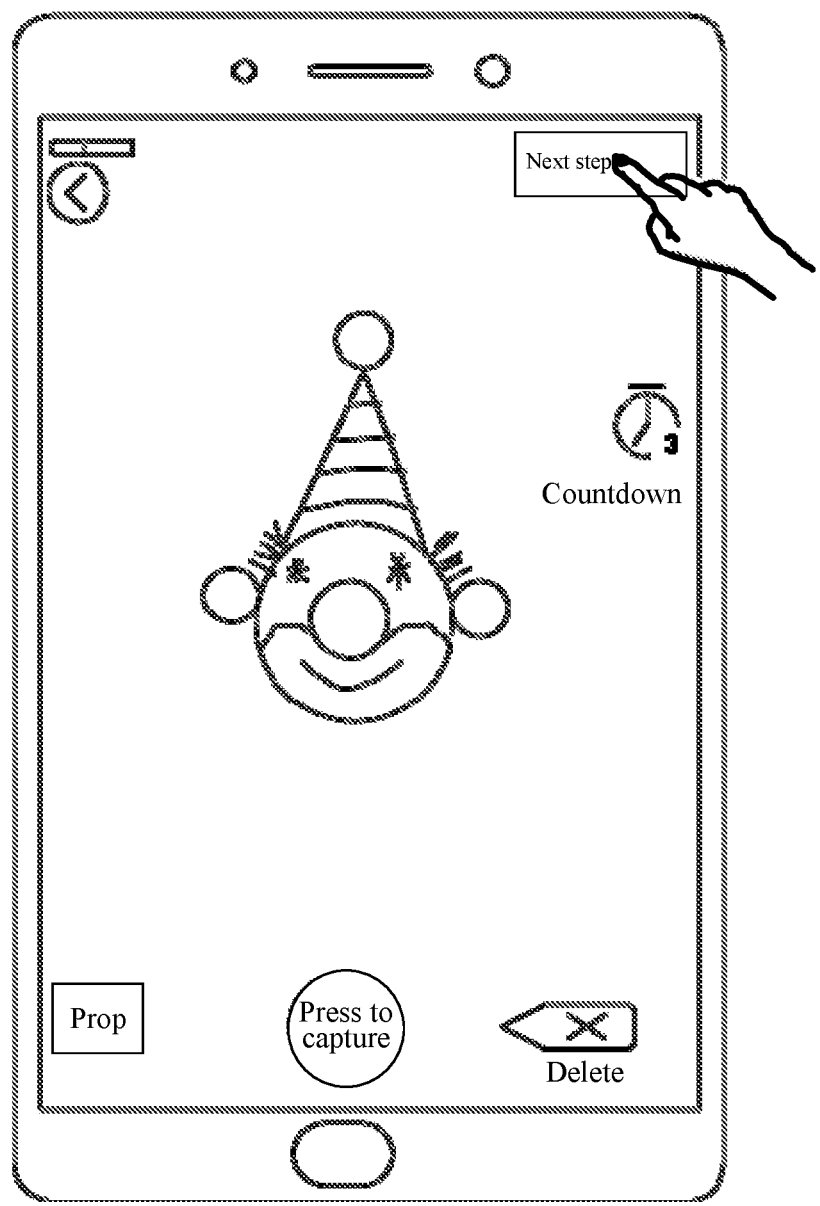
FIG. 4J is a structural diagram of another wait capturing instruction interface according to an embodiment of the present disclosure.
Figure 4K:
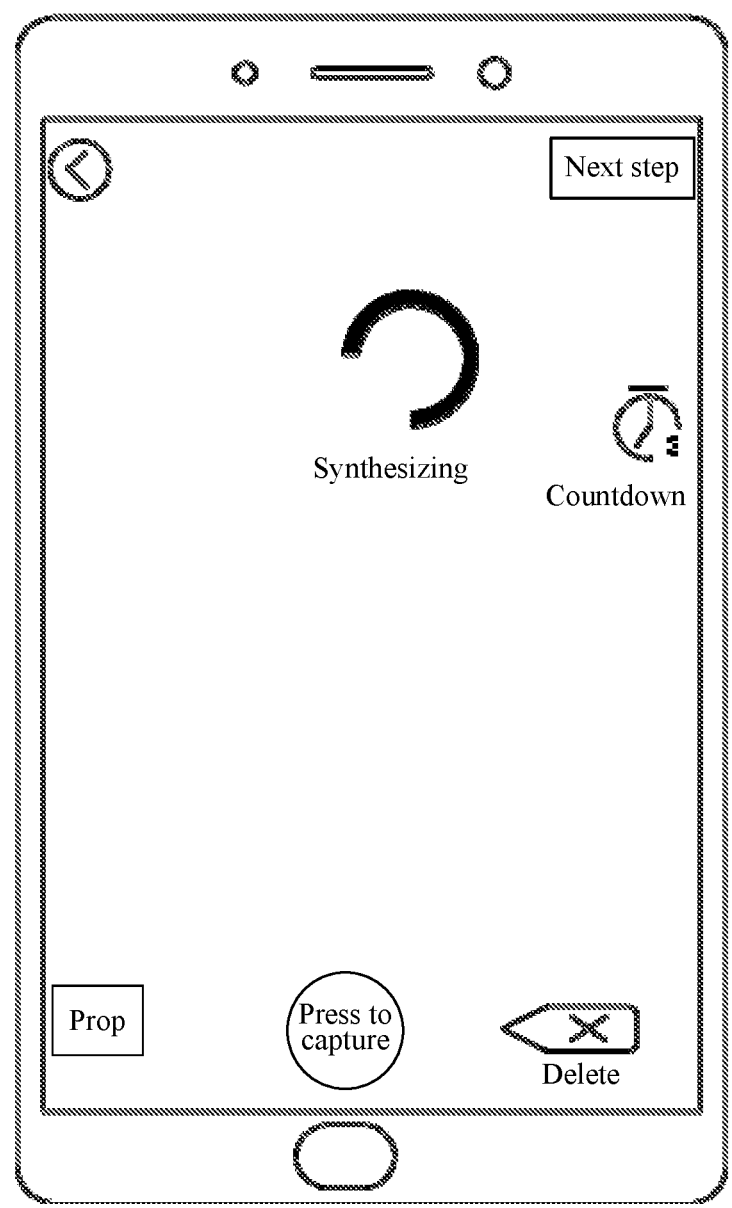
FIG. 4K is a structural diagram of a synthesis interface according to an embodiment of the present disclosure.

As shown in FIG. 4D, the user long presses the press-to-capture control and it is jumped to a capturing interface shown in FIG. 4E. Then, the user may perform video capturing on a current target scenario while a progress bar is displayed at the upper left corner of the capturing interface. When the user releases the press-to-capture control, the capturing of a current video segment is completed, a corresponding current video segment is obtained, and it is jumped to a wait capturing instruction interface shown in FIG. 4F. This interface further includes a deletion control. The deletion control may be configured to delete a stored latest video segment. As shown in FIG. 4G, it is jumped to an undo interface shown in FIG. 4H through a trigger operation of the user on the deletion control on the wait capturing instruction interface, and a dialog box is displayed on the undo interface. As shown in FIG. 4H, it is jumped to a wait capturing instruction interface shown in FIG. 4I through a trigger operation of a sure control on the undo interface. This wait capturing instruction interface and the wait capturing instruction interface before the undoing is performed are different in the progress bar positioned at the upper left corner shown in the drawings. After the corresponding video segment is deleted, the length of the corresponding position of the progress bar is also deleted. Additionally, to obtain a next video segment, the user may repeatedly perform the selection operation on the prop and the subsequent capturing operations described above. In an embodiment, the user ends the capturing of each video segment by releasing the press-to-capture control. As shown in FIG. 4J, it is jumped to a synthesis interface shown in FIG. 4K through a trigger operation of the user on the next step control on the wait capturing instruction interface, and stored video segments are synthesized to obtain a target video. At this point, the synthesizing operation of the video segments and the editing processing operation of the obtained target video by the synthesis are completed.

Figure 4L:
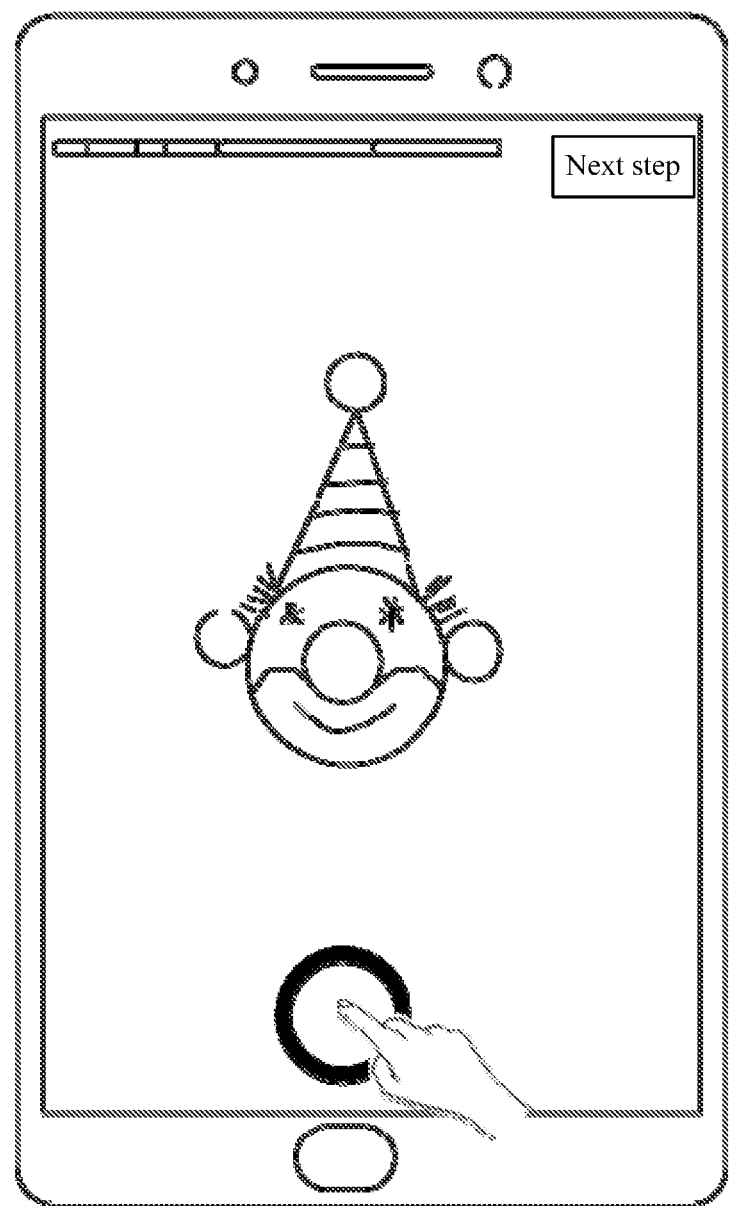
FIG. 4L is a structural diagram of another capturing interface according to an embodiment of the present disclosure.

In an embodiment, a terminal device sets a predetermined capturing time threshold, that is, the maximum length that the target video captured by the user can reach. The user long presses the press-to-capture control and it is jumped to a capturing interface shown in FIG. 4L. Then, the user may perform video capturing on a current target scenario while a progress bar is displayed at the upper left corner of the capturing interface. This capturing interface and the capturing interface shown in FIG. 4E are different in the progress bar positioned at the upper left corner shown in the drawings. Each time a video segment is obtained, a length corresponding to the duration of the video segment is added to the tail of the progress bar. If after a long-press operation of the user on the press-to-capture control is detected, the sum of the length of obtained video segments and the length of a video segment captured for the last time is equal to the predetermined capturing time threshold, then the video segment captured for the last time is stored. In this case, it is not necessary to detect the trigger operation of the user on the next step control. That is, the interface shown in FIG. 4J is skipped and it is directly jumped to a synthesis interface shown in FIG. 4K to display a result of obtaining the target video by synthesizing all the video segments.

Figure 4M:
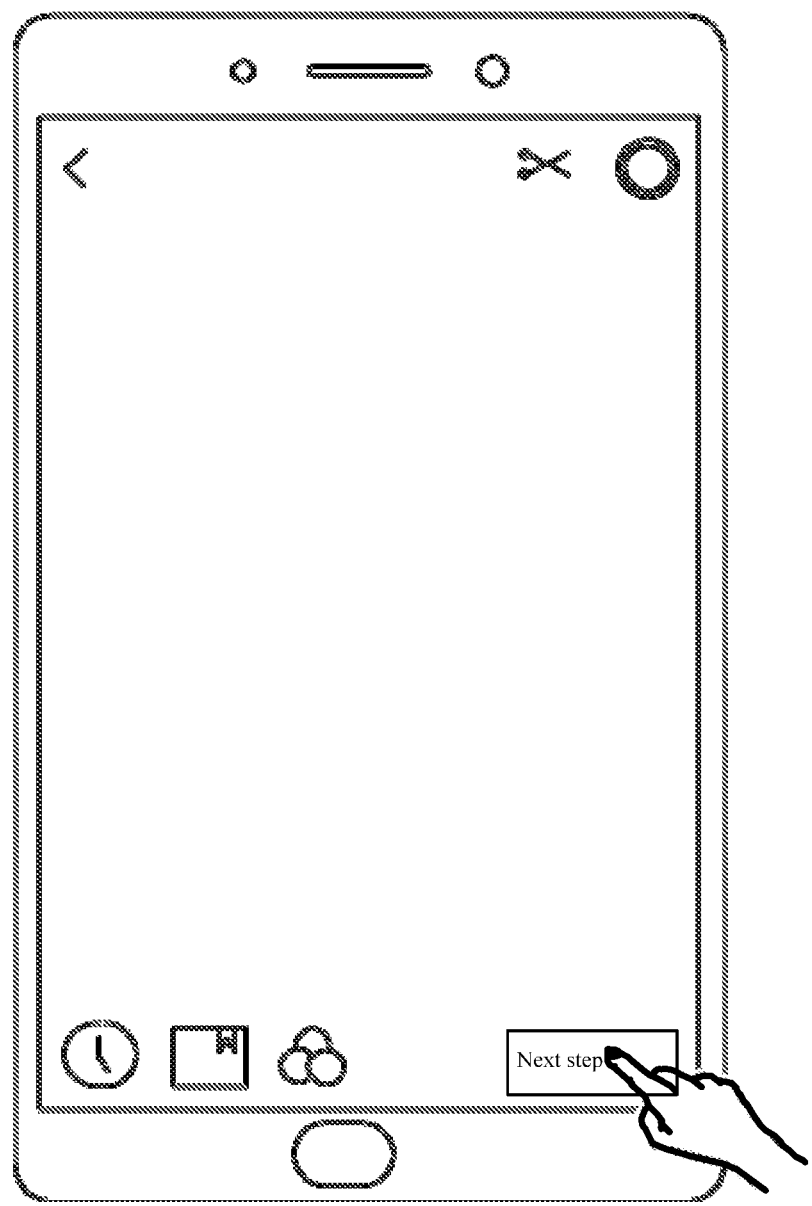
FIG. 4M is a structural diagram of another synthesis interface according to an embodiment of the present disclosure.
Figure 4N:
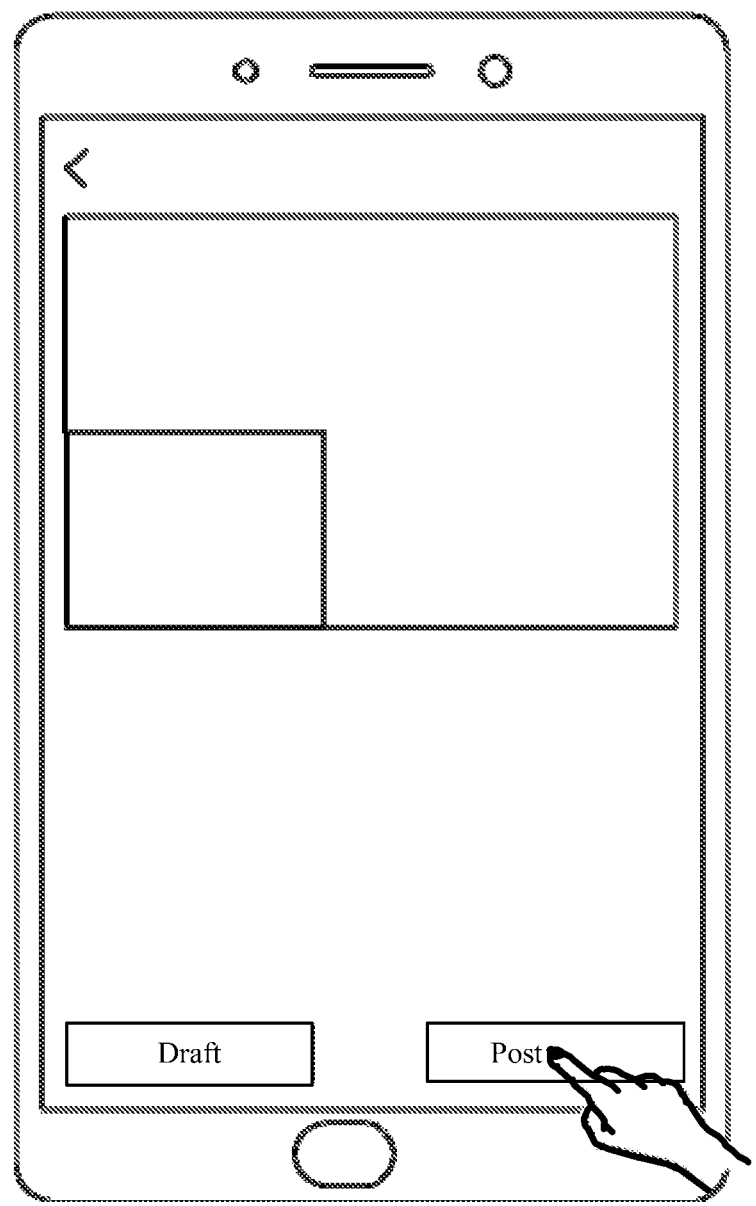
FIG. 4N is a structural diagram of a captured video storage interface according to an embodiment of the present disclosure.
Figure 4O:
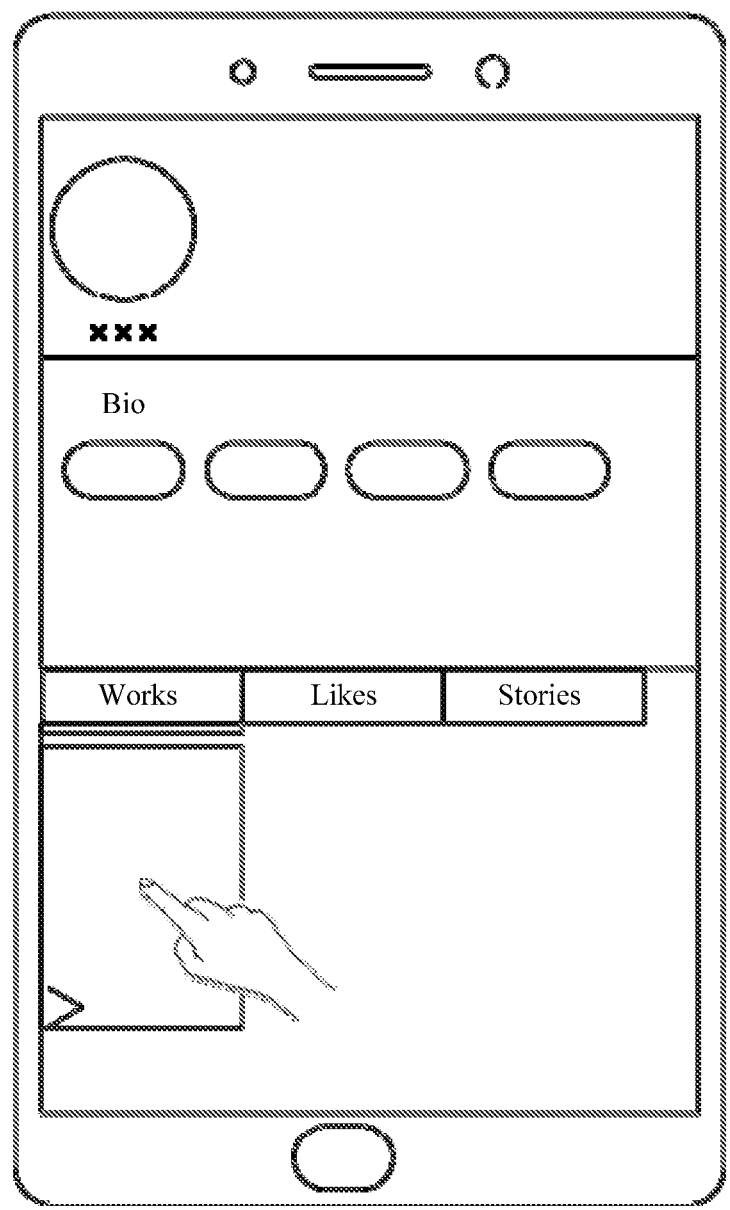
FIG. 4O is a structural diagram of a user homepage interface according to an embodiment of the present disclosure.
Figure 4P:
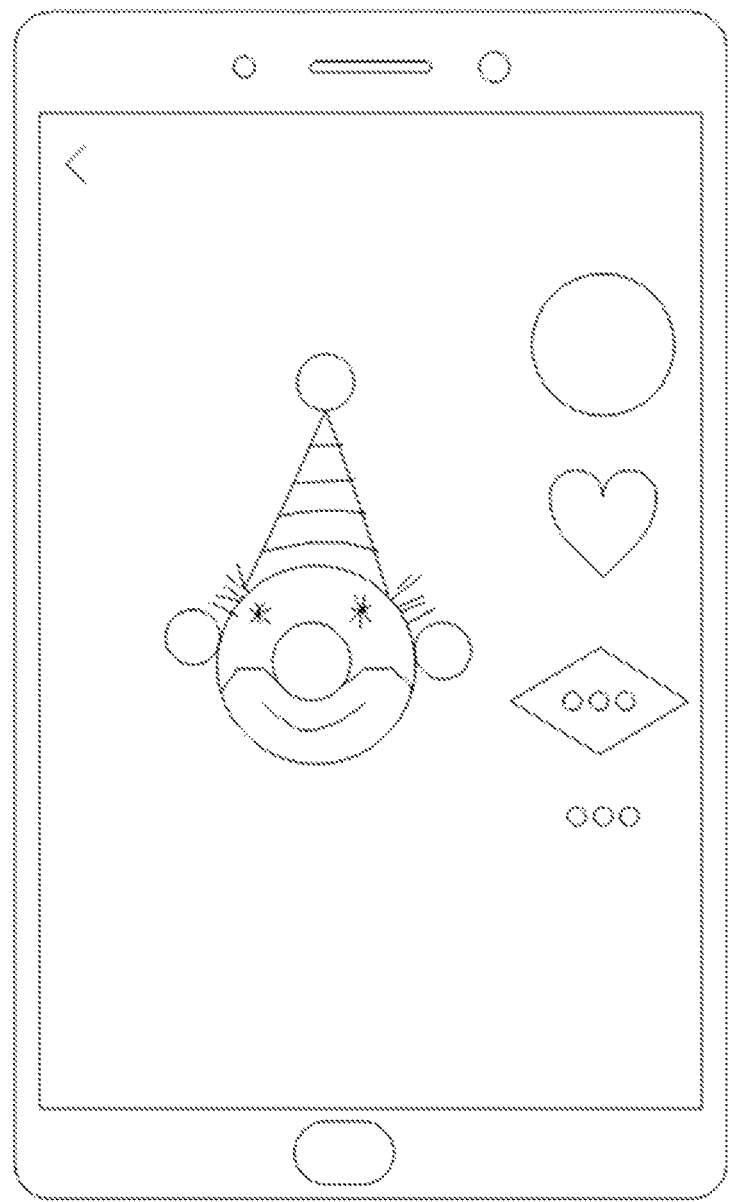
FIG. 4P is a structural diagram of a video playing interface according to an embodiment of the present disclosure.

As shown in FIG. 4M, it is jumped to a captured video storage interface shown in FIG. 4N through a trigger operation of the user on the next step control on the synthesis interface. The captured video storage interface may include a storage mode control (not shown in FIG. 4N). The storage mode control may include a draft-box control and a post control. It is jumped to a user homepage interface shown in FIG. 4O through a trigger operation of the user on the post control. The user homepage interface may include a works control. It is jumped to a video playing interface as shown in FIG. 4P through a trigger operation of the works control and the target video is played. The video playing interface may include a share control, a like control, a comment control and the like.

Figure 4Q:
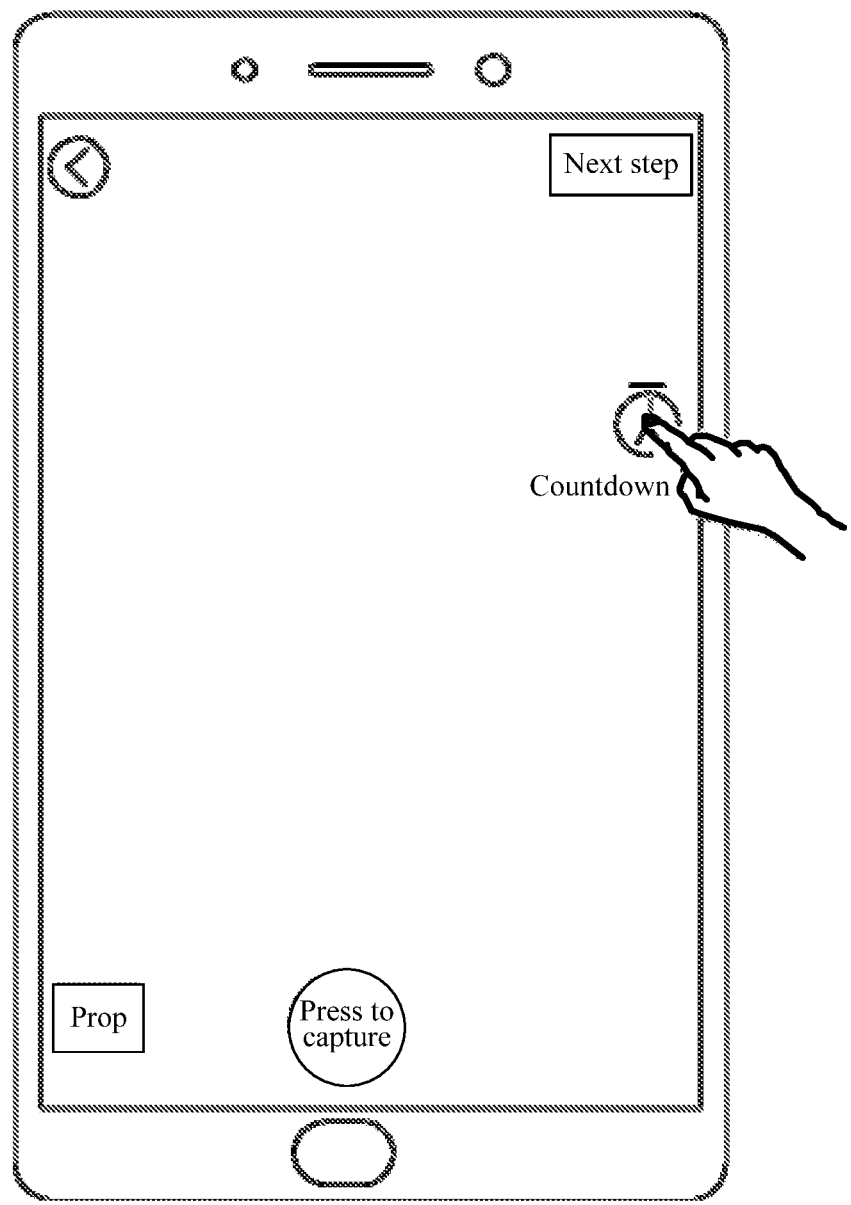
FIG. 4Q is a structural diagram of another wait capturing instruction interface according to an embodiment of the present disclosure.
Figure 4R:
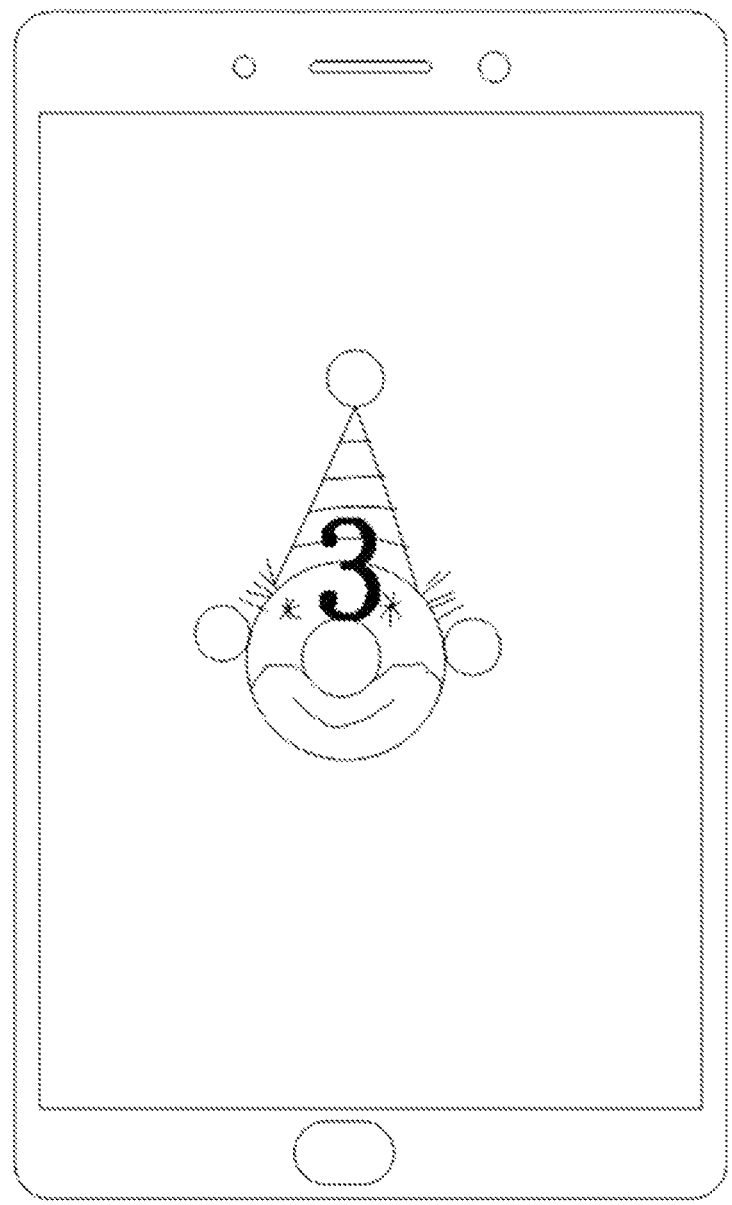
FIG. 4R is a structural diagram of a countdown interface according to an embodiment of the present disclosure.
Figure 4S:
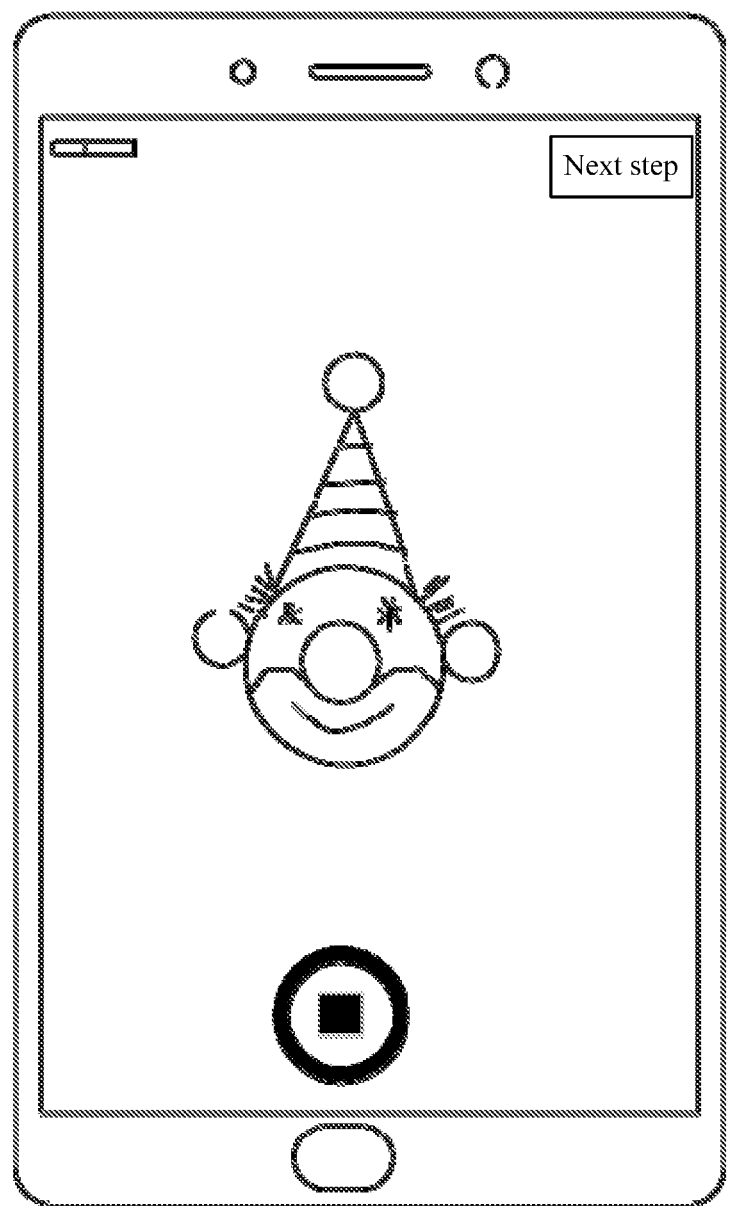
FIG. 4S is a structural diagram of another capturing interface according to an embodiment of the present disclosure.

Additionally, before FIG. 4D is entered, as shown in FIG. 4Q, it is jumped to a countdown interface shown in FIG. 4R through a trigger operation of the user on the countdown control on the wait capturing instruction interface. After 3 seconds of a countdown on this interface, it is jumped to a capturing interface shown in FIG. 4S.

According to the technical scheme of this embodiment of the present disclosure, corresponding instructions are acquired by identifying different operations of the user on the display interfaces, so as to trigger the capturing to obtain multiple video segments, and then, the video segments are beautified and the multiple video segments are synthesized to obtain the target video. In this way, the intervention of video processing software is no longer required, thereby improving the flexibility of the user in the video capturing and video processing and improving the user experience.

Embodiment Five

Figure 5:
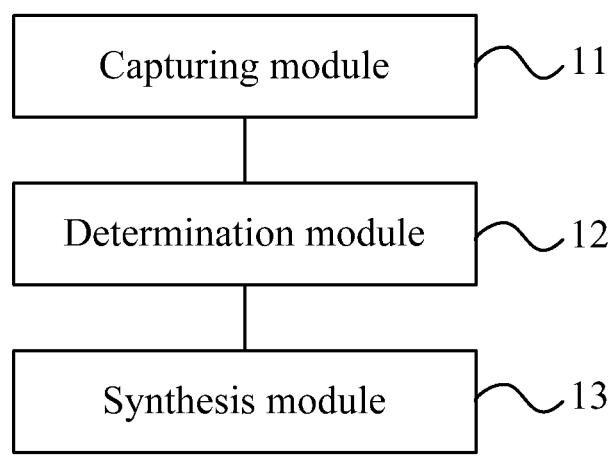
FIG. 5 is a structural diagram of an apparatus for capturing a video according to an embodiment of the present disclosure.

FIG. 5 is a structural diagram of an apparatus for capturing a video according to an embodiment of the present disclosure. The apparatus includes a capturing module 11, a determination module 12 and a synthesis module 13. The capturing module 11 is configured to acquire a video captured instruction, and perform video capturing on a target scenario until acquiring a video captured pause instruction, so as to obtain a video segment captured between the video captured instruction and the video captured pause instruction. The determination module 12 is configured to determine whether a video generation instruction is acquired. The capturing module 11 is further configured to, if the video generation instruction is not acquired, acquire the video captured instruction and the video segment pause instruction repeatedly to obtain corresponding video segments until acquiring the video generation instruction. The synthesis module is configured to, based on the video generation instruction, generate a target video according to the obtained video segments.

In an embodiment, the video captured pause instruction is triggered by a user or by determining whether a length of capturing time reaches a predetermined capturing time threshold.

In an embodiment, the determination module 12 is further configured to determine whether the length of capturing time reaches the predetermined capturing time threshold, and if the length of capturing time reaches the predetermined capturing time threshold, trigger the video captured pause instruction. The length of capturing time includes the length of capturing time for a captured video segment, or the total length of capturing time for multiple captured video segments.

In an embodiment, the capturing module 11 is further configured to acquire a capturing prop, acquire a video frame obtained by a camera capturing the target scenario, and superpose the capturing prop onto the video frame.

In an embodiment, the video captured instruction includes a countdown capturing instruction. The capturing module 11 is further configured to, when the countdown capturing instruction is acquired, start timing until the timing reaches set duration, and perform the video capturing on the target scenario.

In an embodiment, the capturing module 11 is further configured to acquire a capturing undo instruction, and undo a synthesized video segment according to the capturing undo instruction; acquire the video captured instruction and the video segment pause instruction to obtain corresponding video segments until acquiring the video generation instruction, and generate a new target video according to obtained video segments.

In an embodiment, the capturing module 11 is further configured to acquire a deletion instruction, and delete a latest obtained video segment according to the deletion instruction; acquire the video captured instruction and the video segment pause instruction to obtain corresponding video segments until acquiring the video generation instruction, and generate a target video according to obtained video segments.

Embodiment Six

Figure 6:
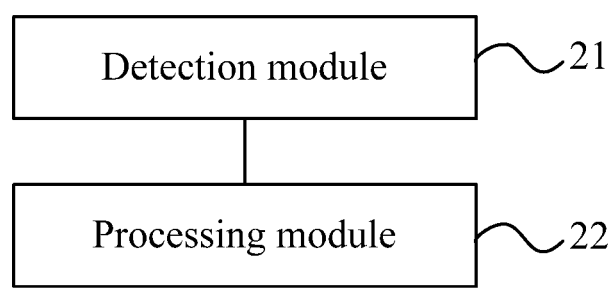
FIG. 6 is a structural diagram of another apparatus for capturing a video according to an embodiment of the present disclosure.

FIG. 6 is a structural diagram of another apparatus for capturing a video according to an embodiment of the present disclosure. The apparatus includes a detection module 21 and a processing module 22. The detection module 21 is configured to detect a long-press operation of a press-to-capture control on a wait capturing instruction interface. The processing module 22 is configured to display a captured target scenario on the wait capturing instruction interface until detecting a release operation of the press-to-capture control, so as to obtain a corresponding video segment. The detection module 21 is further configured to determine whether a trigger operation of a next step control on the wait capturing instruction interface is detected, and if the trigger operation of the next step control on the wait capturing instruction interface is not detected, acquire the long-press operation and the release operation of the press-to-capture control repeatedly to obtain corresponding video segments until detecting the trigger operation of the next step control on the wait capturing instruction interface. The processing module 22 is further configured to, jump from the wait capturing instruction interface to a captured video storage interface according to the trigger operation of the next step control, and display, on the captured video storage interface, a result of obtaining a target video by synthesizing the obtained video segments.

In an embodiment, the processing module 22 is further configured to determine whether a length of capturing time reaches a predetermined capturing time threshold, and if the length of capturing time reaches the predetermined capturing time threshold, jump to the captured video storage interface and display the result of obtaining the target video by synthesizing the obtained video segments. The length of capturing time includes the length of capturing time for a captured video segment or the total length of capturing time for multiple captured video segments.

In an embodiment, the detection module 21 is further configured to detect a selection operation of a user on a prop control on the wait capturing instruction interface; the processing module 22 is further configured to display, on the wait capturing instruction interface, the captured target scenario on which a capturing prop selected by the user is superposed.

In an embodiment, the detection module 21 is further configured to detect a trigger operation of the user on a countdown control on the wait capturing instruction interface; the processing module 22 is further configured to, when the trigger operation of the user on the countdown control is detected, start timing until the timing reaches set duration, and display the current target scenario on the wait capturing instruction interface.

In an embodiment, the detection module 21 is further configured to detect a trigger operation of the user on a return control on the captured video storage interface, and jump to the wait capturing instruction interface.

In an embodiment, the detection module 21 is further configured to detect a trigger operation of the user on a deletion control on the wait capturing instruction interface, and delete a latest obtained video segment.

The apparatuses for capturing a video provided by the embodiments of the present disclosure may perform the method for capturing a video of any embodiment of the present disclosure, and have corresponding function modules and effects for performing the method.

Embodiment Seven

Figure 7:
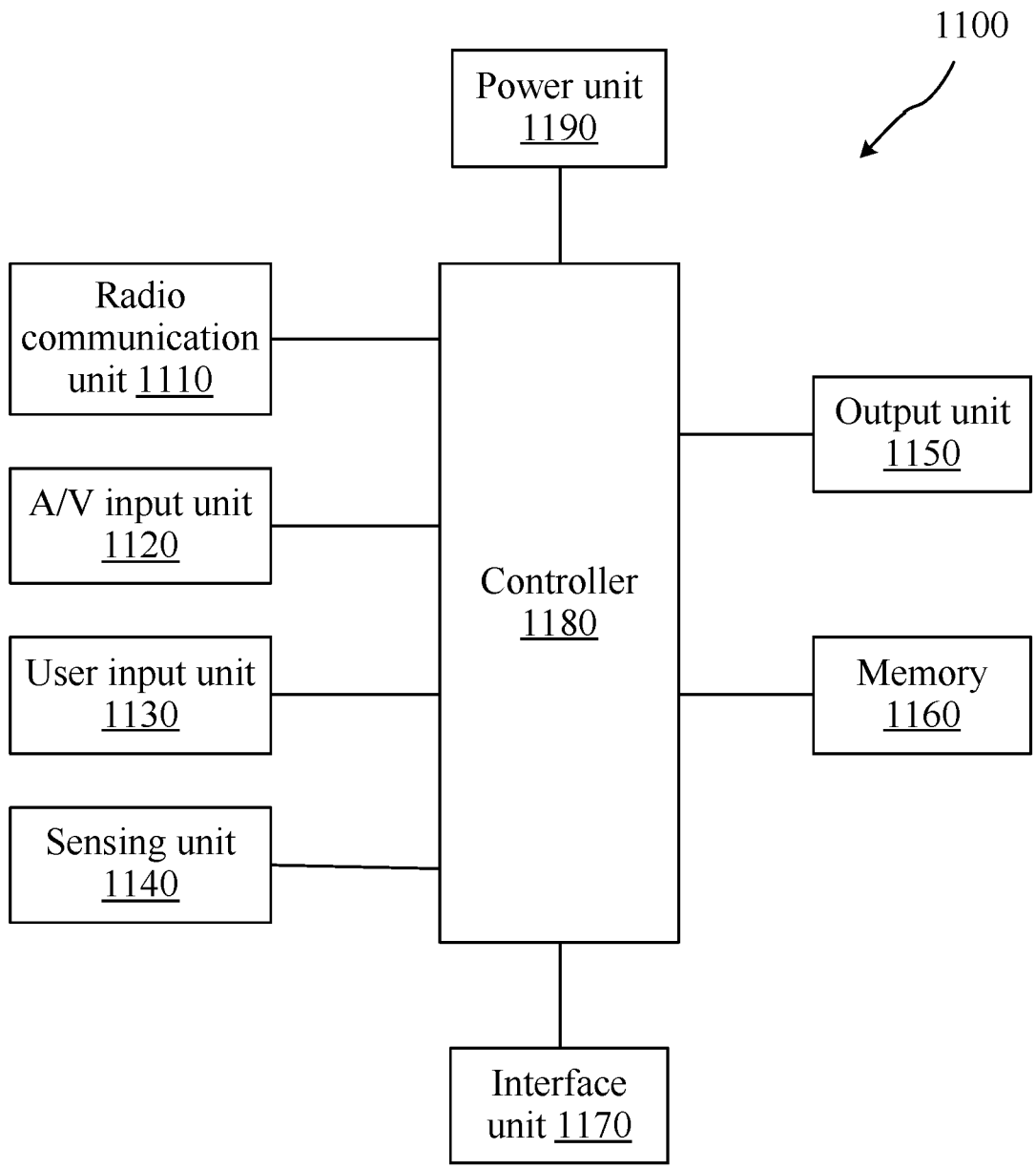
FIG. 7 is a schematic diagram of a hardware structure of a terminal device according to an embodiment of the present disclosure.

FIG. 7 is a structural diagram of a hardware structure of a terminal device according to an embodiment of the present disclosure. A terminal device may be implemented in one or more forms. The terminal device in the present disclosure may include, but is not limited to, a mobile terminal device such as a mobile phone, a smart phone, a laptop, a digital broadcast receiver, a personal digital assistant (PDA), a portable device (PAD), a portable media player (PMP), a navigation apparatus, an in-vehicle terminal device, an in-vehicle display terminal and an in-vehicle electronic rear-view mirror; and a stationary terminal device such as a digital television (TV) and a desktop computer.

As shown in FIG. 7, a terminal device 1100 may include a radio communication unit 1110, an audio/video (A/V) input unit 1120, a user input unit 1130, a sensing unit 1140, an output unit 1150, a memory 1160, an interface unit 1170, a controller 1180, a power unit 1190 and the like. FIG. 7 shows the terminal device having various components, but it is to be understood that all of the illustrated components is not required to be implemented. Alternatively, more or fewer components may be implemented.

The radio communication unit 1110 allows the terminal device 1100 to perform radio communication with a radio communication system or a network. The A/V input unit 1120 is configured to receive an audio signal or a video signal. The user input unit 1130 may generate, according to a command input by a user, key input data to control one or more operations of the terminal device. The sensing unit 1140 is configured to detect a current state of the terminal device 1100, the position of the terminal device 1100, whether there is a touch input by the user onto the terminal device 1100, an orientation of the terminal device 1100, an acceleration or deceleration movement and a direction of the terminal device 1100, and the like, and generate commands or signals for controlling operations of the terminal device 1100. The interface unit 1170 is used as an interface through which at least one external apparatus can connect to the terminal device 1100. The output unit 1150 is configured to provide an output signal in a visual, audio and/or tactile manner. The memory 1160 may store software programs of the processing and controlling operations performed by the controller 1180, or may temporarily store data that has been outputted or is to be outputted. The memory 1160 may include at least one type of storage medium. Moreover, the terminal device 1100 may cooperate with a network storage apparatus that performs the storage function of the memory 1160 and is connected to the terminal device 1100 via a network. The controller 1180 usually controls overall operations of the terminal device. Additionally, the controller 1180 may include a multimedia module for reproducing or playing back multimedia data. The controller 1180 may perform mode recognition processing to recognize a handwriting input or a picture drawing input performed on a touch panel as characters or images. The power unit 1190 receives, under the control of the controller 1180, external power or internal power and supplies the appropriate power required for operating each element and component.

An embodiment of the present disclosure further provides a storage medium including an executable instruction. The executable instruction is configured to, when executed by a controller, perform relevant operations in the method for capturing a video of any embodiment of the present disclosure.

According to the above description about the implementations, it is apparent to those skilled in the art that the embodiments of the present application may be implemented by means of software and general-purpose hardware, or may be implemented by hardware. Based on this understanding, the technical schemes of the embodiments of the present disclosure substantially, or the part contributing to the related art, may be embodied in the form of a software product. The computer software product is stored in a computer readable storage medium such as a floppy disk, a read-only memory (ROM), a random access memory (RAM), a flash, a hard disk or an optical disk of the computer. The computer software product includes multiple instructions for enabling a computer device (which may be a personal computer, a server or a network device) to perform the methods of the one or more embodiments of the present disclosure.

The multiple modules and/or units included in the apparatus embodiments described above are divided just according to function logic, and the division is not limited to this as long as the corresponding functions can be implemented. Additionally, the name of each function unit is just intended to distinguish each other but not intended to limit the scope of the embodiments of the present disclosure.

What is claimed is:

1. A method for capturing a video, comprising:
   acquiring a video captured instruction, and performing video capturing on a target scenario until acquiring a video captured pause instruction, so as to obtain a video segment captured between the video captured instruction and the video captured pause instruction;
   determining whether a video generation instruction is acquired;
   in response to determining that the video generation instruction is not acquired, acquiring the video captured instruction and the video captured pause instruction repeatedly to obtain at least one video segment until acquiring the video generation instruction; and
   based on the video generation instruction, generating a target video according to the obtained video segments.

2. The method of claim 1, wherein the video captured pause instruction is triggered by a user or by determining whether a length of capturing time reaches a predetermined capturing time threshold.

3. The method of claim 2, wherein triggering the video captured pause instruction by determining whether the length of capturing time reaches the predetermined capturing time threshold comprises:
   in response to determining that the length of capturing time reaches the predetermined capturing time threshold, triggering the video captured pause instruction, wherein the length of capturing time comprises a length of capturing time for a captured video segment, or a total length of capturing time for a plurality of captured video segments.

4. The method of claim 1, wherein before acquiring the video captured instruction each time, the method further comprises: acquiring a capturing prop; and
   wherein performing the video capturing on the target scenario comprises: acquiring a video frame obtained by a camera capturing the target scenario, and superposing the capturing prop onto the video frame.

5. The method of claim 1, wherein the video captured instruction comprises a countdown capturing instruction; and
   wherein performing the video capturing on the target scenario comprises:
   when the countdown capturing instruction is acquired, starting timing until the timing reaches a set duration, and performing the video capturing on the target scenario.

6. The method of claim 1, wherein after generating the target video according to the obtained video segments, the method further comprises:
   acquiring a capturing undo instruction, and undoing a synthesized video segment according to the capturing undo instruction; and
   acquiring the video captured instruction and the video captured pause instruction repeatedly to obtain one or more video segments until acquiring the video generation instruction, and generating a new target video according to obtained video segments.

7. The method of claim 1, further comprising:
   acquiring a deletion instruction, and deleting a latest obtained video segment according to the deletion instruction; and
   acquiring the video captured instruction and the video captured pause instruction repeatedly to obtain one or more video segments until acquiring the video generation instruction, and generating a new target video according to obtained video segments.

8. A non-transitory computer readable storage medium, comprising an executable instruction, wherein the executable instruction is configured to, when executed by a controller, perform the method of claim 1.

9. A method for capturing a video, comprising:
   detecting a long-press operation of a press-to-capture control on a wait capturing instruction interface;
   displaying a captured target scenario on the wait capturing instruction interface until detecting a release operation of the press-to-capture control, so as to obtain a video segment;
   determining whether a trigger operation of a next step control on the wait capturing instruction interface is detected;
   in response to determining that the trigger operation of the next step control on the wait capturing instruction interface is not detected, acquiring the long-press operation and the release operation of the press-to-capture control repeatedly to obtain at least one video segment until detecting the trigger operation of the next step control on the wait capturing instruction interface; and
   jumping, according to the trigger operation of the next step control, from the wait capturing instruction interface to a captured video storage interface, and displaying, on the captured video storage interface, a result of obtaining a target video by synthesizing the obtained video segments.

10. The method of claim 9, further comprising:
    determining whether a length of capturing time reaches a predetermined capturing time threshold while the captured target scenario is displayed on the wait capturing instruction interface; and
    in response to determining that the length of capturing time reaches the predetermined capturing time threshold, jumping to the captured video storage interface and displaying the result of obtaining the target video by synthesizing the obtained video segments, wherein the length of capturing time comprises a length of capturing time for a captured video segment or a total length of capturing time for a plurality of captured video segments.

11. The method of claim 9, wherein before detecting the long-press operation of the press-to-capture control on the wait capturing instruction interface, the method further comprises:
    detecting a selection operation of a user on a prop control on the wait capturing instruction interface; and
    wherein displaying the captured target scenario on the wait capturing instruction interface comprises: displaying, on the wait capturing instruction interface, a currently captured target scenario on which a capturing prop selected by the user is superposed.

12. The method of claim 9, further comprising: detecting a trigger operation of a user on a countdown control on the wait capturing instruction interface; and wherein displaying the captured target scenario on the wait capturing instruction interface comprises:

when the trigger operation of the user on the countdown control is detected, starting timing until the timing reaches a set duration, and displaying the captured target scenario on the wait capturing instruction interface.

13. The method of claim 9, wherein after jumping to the captured video storage interface and displaying the result of obtaining the target video by synthesizing the obtained video segments, the method further comprises:

detecting a trigger operation of a user on a return control on the captured video storage interface, and jumping to the wait capturing instruction interface.

14. The method of claim 9, further comprising:

detecting a trigger operation of a user on a delete control on the wait capturing instruction interface, and deleting a latest obtained video segment.

15. A terminal device, comprising a memory, a controller, and a program stored in the memory and executable on the controller, wherein the controller, when executing the program, implements:

acquiring a video captured instruction, and performing video capturing on a target scenario until acquiring a video captured pause instruction, so as to obtain a video segment captured between the video captured instruction and the video captured pause instruction;

determining whether a video generation instruction is acquired;

in response to determining that the video generation instruction is not acquired, acquiring the video captured instruction and the video captured pause instruction repeatedly to obtain at least one video segment until acquiring the video generation instruction; and based on the video generation instruction, generating a target video according to the obtained video segments.

\* \* \* \* \*